US008009955B2

(12) United States Patent
Smith et al.

(10) Patent No.: US 8,009,955 B2
(45) Date of Patent: Aug. 30, 2011

(54) RESKINNABLE FIBER DISTRIBUTION HUB

(75) Inventors: Trevor D. Smith, Eden Prairie, MN (US); Thomas G. LeBlanc, Westminster, MA (US); James J. Solheid, Lakeville, MN (US); Cindy S. Walters, Prior Lake, MN (US); Matthew Holmberg, Le Center, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/752,677

(22) Filed: Apr. 1, 2010

(65) Prior Publication Data

US 2011/0083310 A1   Apr. 14, 2011

Related U.S. Application Data

(62) Division of application No. 11/796,805, filed on Apr. 30, 2007, now Pat. No. 7,711,234.

(60) Provisional application No. 60/848,902, filed on Oct. 2, 2006.

(51) Int. Cl.
*G02B 6/00* (2006.01)
(52) U.S. Cl. .......................... 385/135; 385/134
(58) Field of Classification Search .................. 385/135, 385/134
See application file for complete search history.

(56) References Cited

U.S. PATENT DOCUMENTS

| | | | |
|---|---|---|---|
| 1,342,269 A | 6/1920 | Stewart | |
| 3,742,119 A | 6/1973 | Newman | |
| 4,644,095 A | 2/1987 | Bright et al. | |
| 4,775,200 A | 10/1988 | Sheu | |
| 4,890,318 A | 12/1989 | Crane et al. | |
| 5,023,397 A | 6/1991 | Tomes et al. | |
| 5,262,588 A | 11/1993 | Gallagher | |
| 5,459,808 A | 10/1995 | Keith | |
| 5,717,810 A | 2/1998 | Wheeler | |
| 5,734,774 A | 3/1998 | Morrell | |
| 5,737,475 A | 4/1998 | Regester | |
| 5,747,734 A | 5/1998 | Kozlowski et al. | |
| 5,806,948 A | 9/1998 | Rowan et al. | |
| 5,911,117 A | 6/1999 | Bhame et al. | |
| 5,933,563 A | 8/1999 | Schaffer et al. | |
| 6,062,665 A | 5/2000 | Schneider et al. | |
| 6,095,482 A | 8/2000 | LaGrotta et al. | |
| 6,127,627 A | 10/2000 | Daoud | |
| 6,160,946 A | 12/2000 | Thompson et al. | |
| 6,238,029 B1 | 5/2001 | Marzec et al. | |
| 6,316,728 B1 | 11/2001 | Hoover et al. | |
| 6,330,152 B1 | 12/2001 | Vos et al. | |

(Continued)

FOREIGN PATENT DOCUMENTS

DE   7319283   8/1973

(Continued)

*Primary Examiner* — Uyen-Chau N Le
*Assistant Examiner* — Kajli Prince
(74) *Attorney, Agent, or Firm* — Merchant & Gould P.C.

(57) ABSTRACT

The housing of a telecommunications cabinet can be replaced without recabling the internal components by removing a panel arrangement from a cable access region of the cabinet to reveal an open end of the cable access region that is continuous with the open side of the cabinet. The frame is uncoupled from the cabinet and the cabinet is slid away from the internal components. The fiber optic cables pass through the open end of the cable access region and through the open side of the cabinet.

10 Claims, 23 Drawing Sheets

U.S. PATENT DOCUMENTS

| | | | |
|---|---|---|---|
| 6,498,293 | B2 | 12/2002 | Marchand et al. |
| 6,535,682 | B1 | 3/2003 | Puetz et al. |
| 6,556,763 | B1 | 4/2003 | Puetz et al. |
| 6,591,053 | B2 | 7/2003 | Fritz |
| 6,603,660 | B1 | 8/2003 | Ehn et al. |
| 6,606,253 | B2 | 8/2003 | Jackson et al. |
| 6,621,975 | B2 | 9/2003 | Laporte et al. |
| 6,657,861 | B2 | 12/2003 | Irmer |
| 6,715,719 | B2 | 4/2004 | Nault et al. |
| 6,760,531 | B1 | 7/2004 | Solheid et al. |
| 6,778,752 | B2 | 8/2004 | Laporte et al. |
| 6,788,535 | B2 | 9/2004 | Dodgen et al. |
| 6,788,786 | B1 | 9/2004 | Kessler et al. |
| 6,791,027 | B1 | 9/2004 | Nicolai et al. |
| 6,792,190 | B2 | 9/2004 | Xin et al. |
| 6,792,191 | B1 | 9/2004 | Clapp, Jr. et al. |
| 6,909,833 | B2 | 6/2005 | Henschel et al. |
| 6,920,213 | B2 | 7/2005 | Pershan |
| 6,920,274 | B2 | 7/2005 | Rapp et al. |
| 6,932,443 | B1 | 8/2005 | Kaplan et al. |
| 6,945,616 | B2 | 9/2005 | Webster et al. |
| 6,980,725 | B1 | 12/2005 | Swieconek |
| 6,983,095 | B2 | 1/2006 | Reagan et al. |
| 7,086,539 | B2 | 8/2006 | Knudsen et al. |
| 7,088,899 | B2 | 8/2006 | Reagan et al. |
| 7,103,255 | B2 | 9/2006 | Reagan et al. |
| 7,139,461 | B2 | 11/2006 | Puetz et al. |
| 7,142,764 | B2 | 11/2006 | Allen et al. |
| 7,146,089 | B2 | 12/2006 | Reagan et al. |
| 7,149,398 | B2 | 12/2006 | Solheid et al. |
| 7,171,102 | B2 | 1/2007 | Reagan et al. |
| 7,194,181 | B2 | 3/2007 | Holmberg et al. |
| 7,198,409 | B2 | 4/2007 | Smith et al. |
| 7,200,317 | B2 | 4/2007 | Reagen et al. |
| 7,218,827 | B2 | 5/2007 | Vongseng et al. |
| 7,228,036 | B2 | 6/2007 | Elkins, II et al. |
| 7,233,731 | B2 | 6/2007 | Solheid et al. |
| 7,245,809 | B1 | 7/2007 | Gniadek et al. |
| 7,259,326 | B2 | 8/2007 | Nguyen |
| 7,273,985 | B2 | 9/2007 | Holmberg et al. |
| 7,277,620 | B2 | 10/2007 | Vongseng et al. |
| 7,298,952 | B2 | 11/2007 | Allen et al. |
| 7,330,626 | B2 | 2/2008 | Kowalczyk et al. |
| 7,333,707 | B2 | 2/2008 | Puetz et al. |
| 7,340,146 | B2 | 3/2008 | Lampert et al. |
| 7,346,254 | B2 | 3/2008 | Kramer et al. |
| 7,369,741 | B2 | 5/2008 | Reagan et al. |
| 7,376,322 | B2 | 5/2008 | Zimmel et al. |
| 7,400,813 | B2 | 7/2008 | Zimmel |
| 7,400,816 | B2 | 7/2008 | Reagen et al. |
| 7,407,330 | B2 | 8/2008 | Smith et al. |
| 7,416,349 | B2 | 8/2008 | Kramer |
| 7,418,181 | B2 | 8/2008 | Zimmel et al. |
| 7,419,384 | B2 | 9/2008 | Neumetzler et al. |
| 7,457,503 | B2 | 11/2008 | Solheid et al. |
| 7,471,869 | B2 | 12/2008 | Reagan et al. |
| 7,492,575 | B2 | 2/2009 | Irmer et al. |
| 7,515,805 | B2 | 4/2009 | Vongseng et al. |
| 7,519,259 | B2 | 4/2009 | Smith et al. |
| 7,646,958 | B1 | 1/2010 | Reagan et al. |
| 7,728,225 | B2 | 6/2010 | Anderson et al. |
| 2004/0228598 | A1 | 11/2004 | Allen et al. |
| 2005/0111810 | A1* | 5/2005 | Giraud et al. .......... 385/135 |
| 2007/0165995 | A1 | 7/2007 | Reagan et al. |
| 2007/0192817 | A1 | 8/2007 | Landry |
| 2008/0008436 | A1 | 1/2008 | Reagan et al. |
| 2008/0042535 | A1 | 2/2008 | Guzzo et al. |
| 2008/0042536 | A1 | 2/2008 | Guzzo et al. |
| 2008/0079341 | A1 | 4/2008 | Anderson et al. |
| 2008/0124039 | A1 | 5/2008 | Gniadek et al. |
| 2008/0317425 | A1 | 12/2008 | Smith et al. |
| 2009/0022467 | A1 | 1/2009 | Puetz et al. |
| 2009/0074372 | A1 | 3/2009 | Solheid et al. |
| 2009/0087157 | A1 | 4/2009 | Smith et al. |
| 2009/0190896 | A1 | 7/2009 | Smith et al. |
| 2009/0196565 | A1 | 8/2009 | Vongseng et al. |
| 2009/0285540 | A1 | 11/2009 | Reagan et al. |
| 2009/0290843 | A1 | 11/2009 | Reagan et al. |
| 2009/0297111 | A1 | 12/2009 | Reagan et al. |
| 2010/0124392 | A1 | 5/2010 | Reagan et al. |

FOREIGN PATENT DOCUMENTS

| | | |
|---|---|---|
| DE | 9105800 U1 | 6/1991 |
| DE | 4232787 C1 | 12/1993 |
| DE | 295 19 260 U1 | 12/1995 |
| DE | 296 13 420 U1 | 10/1996 |
| DE | 196 54 594 A1 | 7/1998 |
| DE | 199 27 517 A1 | 11/2000 |
| DE | 199 40 166 A1 | 3/2001 |
| DE | 199 41 413 A1 | 3/2001 |
| DE | 101 05 993 A1 | 9/2002 |
| EP | 0590286 | 4/1994 |
| EP | 0 849 850 A1 | 6/1998 |
| EP | 1 047 167 A1 | 10/2000 |
| EP | 1 692 556 A | 8/2006 |
| FR | 2 752 103 | 2/1998 |
| FR | 2 766 850 | 2/1999 |
| FR | 2 776 850 | 10/1999 |
| JP | 3307618 | 5/2002 |
| JP | 3761762 | 1/2006 |
| SU | 1320857 | 12/1982 |
| WO | WO 99/27404 | 6/1999 |
| WO | WO 2007/095037 A2 | 8/2007 |

* cited by examiner

RESKINNABLE FIBER DISTRIBUTION HUB

CROSS-REFERENCE TO RELATED APPLICATIONS

This application is a divisional application of Ser. No. 11/796,805, filed Apr. 30, 2007, issued as U.S. Pat. No. 7,711,234 on May 4, 2010, which claims the benefit of provisional application Ser. No. 60/848,902, filed Oct. 2, 2006, which applications are incorporated herein by reference in their entirety.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 101 that connects a number of end subscribers 105 (also called end users 105 herein) in a network. The central office 101 can additionally connect to a larger network such as the Internet (not shown) and/or a public switched telephone network (PSTN).

The network 100 also can include fiber distribution hubs (FDHs) 103 providing interfaces between the central office 101 and the subscribers 105. The FDHs 103 have one or more optical splitters (e.g., 1-to-8 splitters, 1-to-16 splitters, or 1-to-32 splitters) that generate a number of individual fibers that may lead to the premises of end users 105. The various lines of the network 100 can be aerial or housed within underground conduits.

The portion of the network 100 that is closest to central office 101 is generally referred to as the F1 region, where F1 includes a distribution cable that provides "feeder fiber" from the central office 101. The portion of the network 100 closest to the end users 105 can be referred to as an F2 portion of network 100. The network 100 includes a plurality of breakout locations 102 at which branch cables are separated out from the main cable lines. Branch cables are often connected to drop terminals 104 that include connector interfaces for facilitating coupling of the fibers of the branch cables to a plurality of different subscriber locations 105.

Splitters used in an FDH 103 can accept an F1 distribution cable having a number of fibers and may split those incoming fibers into, for example, 216 to 432 individual distribution fibers that may be associated with a like number of end user locations. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 103 as required.

SUMMARY

Certain aspects of the disclosure relate to fiber optic cable systems.

In example systems, a fiber distribution system includes one or more telecommunications cabinets (e.g., fiber distribution hubs) that provide an interface between the central office and the subscribers.

Certain aspects of the disclosure relate to fiber distribution hubs having a removable outer frame or housing which can be replaced when damaged without adjusting the cabling within the fiber distribution hubs.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 22 is a front, perspective view of the telecommunications cabinet of FIG. 21 with the doors removed and a swing frame extended through an open front of the cabinet;

DETAILED DESCRIPTION

Referring now to the figures in general, example telecommunications cabinets, such as fiber distribution hubs (FDHs), having features that are examples of inventive aspects in accordance with the principles of the present disclosure are shown. The cabinets provide interconnect interfaces for optical transmission signals at locations in the network where operational access and reconfiguration are desired. Embodiments of the cabinets can provide termination, splicing, interconnection, splitting, and combinations thereof.

Figure 1:
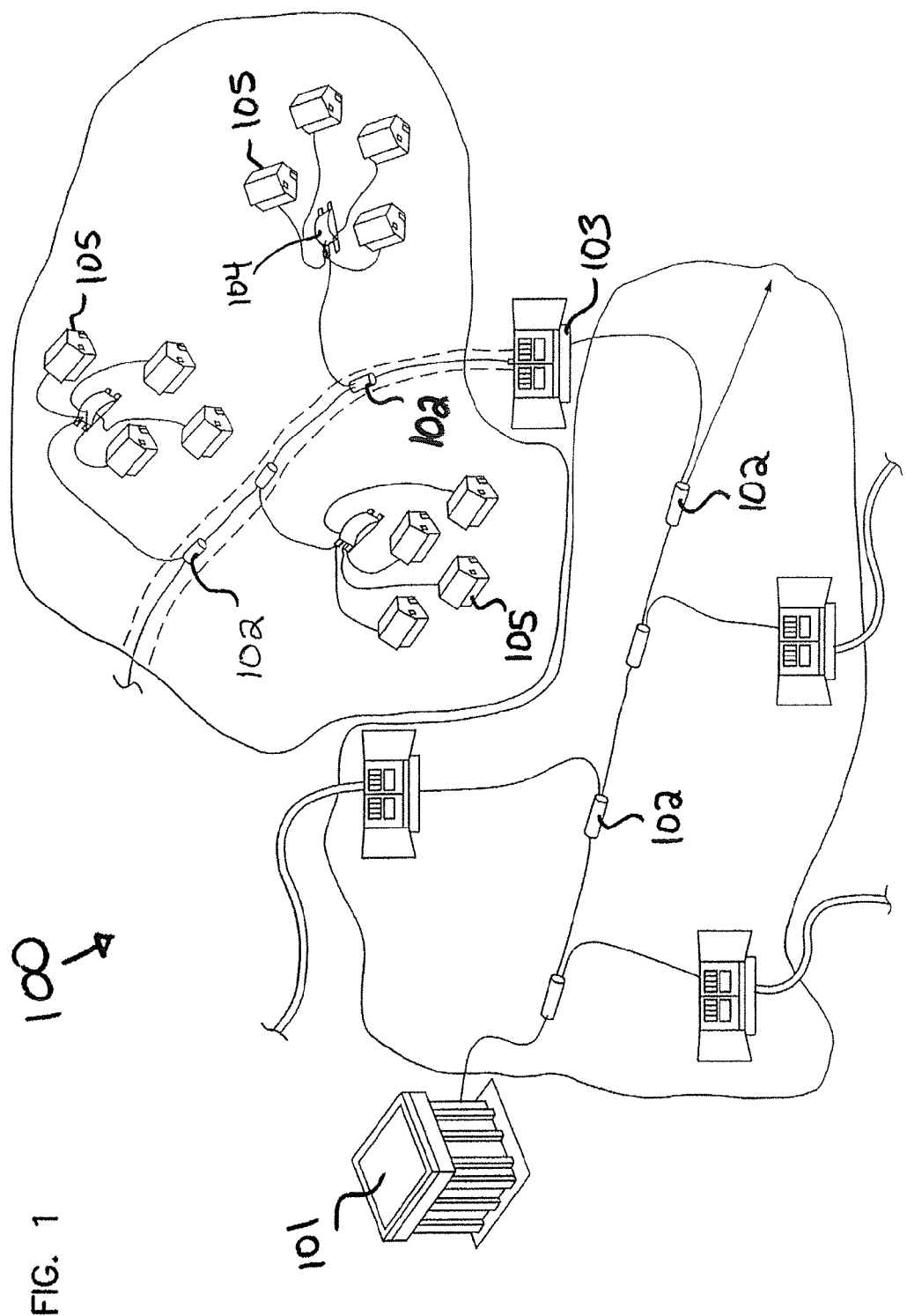
FIG. 1 shows a passive fiber optic network.

An FDH generally administers connections at a termination panel between incoming fiber and outgoing fiber in an Outside Plant (OSP) environment (see FIG. 1). Examples of incoming fibers include the feeder cable fibers that enter the cabinet and intermediate fibers (e.g., connectorized pigtails extending from splitters and patching fibers/jumpers) that connect the feeder cable fiber to the termination panel. Examples of outgoing fibers include the subscriber cable fibers that exit the cabinet and any intermediate fibers that connect the subscriber cable fibers to the termination panel.

As the term is used herein, "a connection" between fibers includes both direct and indirect connections. For example, as noted above, the FDH can include components used to split the F1 distribution cables and components used to terminate the split F1 distribution cables to F2 distribution cables routed to subscriber locations. In addition, the FDH is designed to accommodate a range of alternative sizes and fiber counts and support factory installation of pigtails, fanouts and splitters.

As used herein, the term "distribution cable" means any cable included as part of a fiber optic distribution network. Example distribution cables include feeder cables and subscriber cables.

Figure 2:
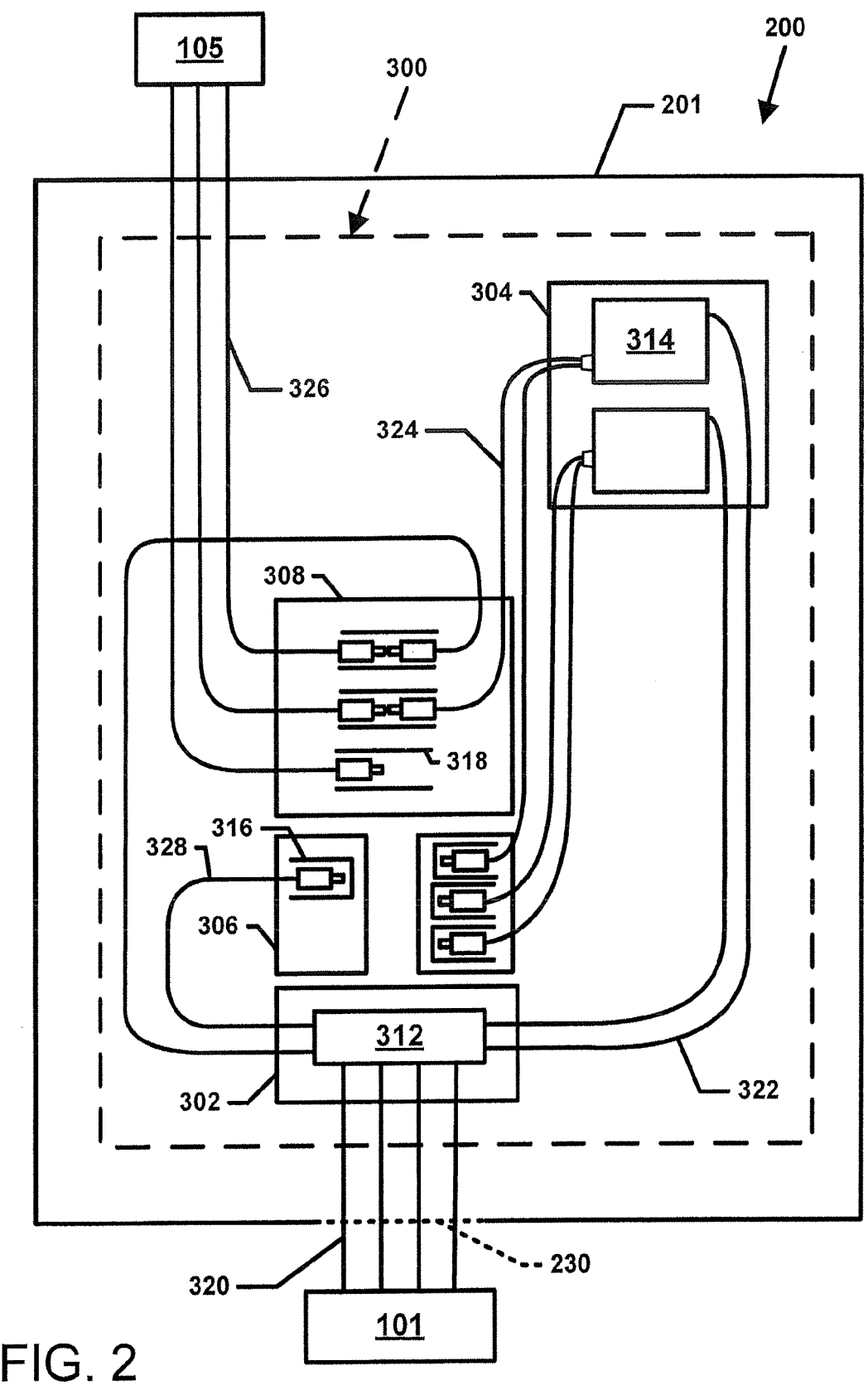
FIG. 2 is a schematic diagram of an example telecommunications cabinet including a cabinet housing and internal components in accordance with an embodiment of the present disclosure.
Figure 4:
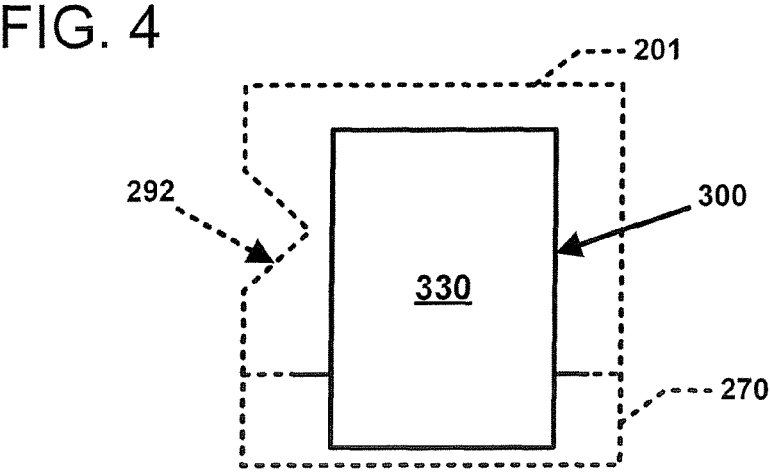
FIGS. 4-9 illustrate some of the steps of the replacement process of FIG. 3 in accordance with an embodiment of the present disclosure.
Figure 5:
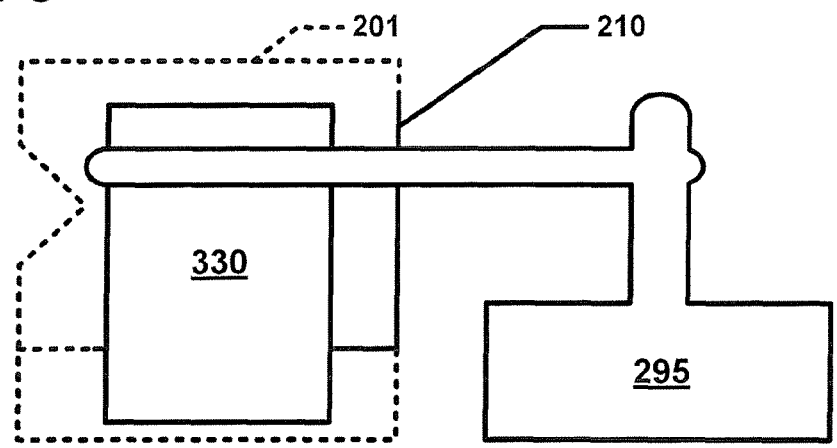
Figure 6:
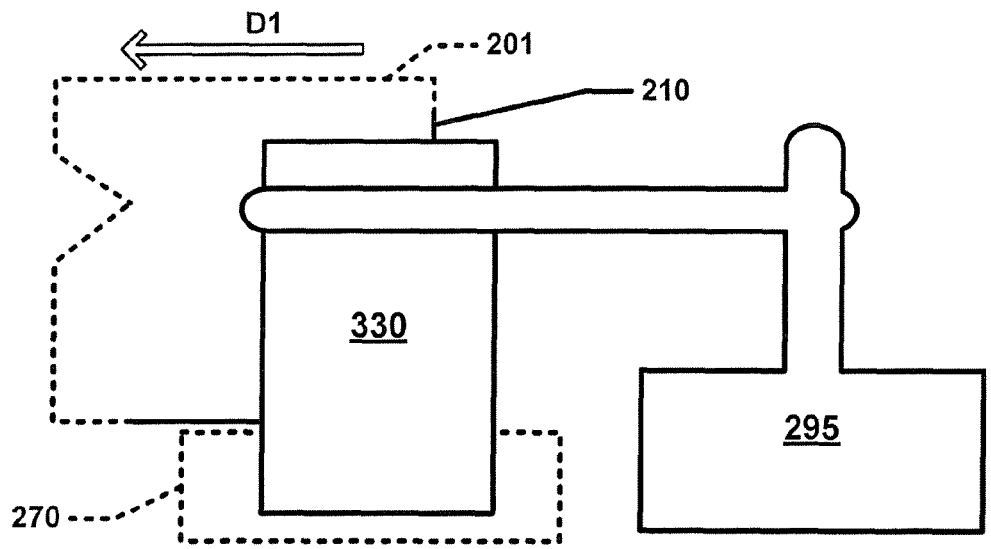
Figure 7:
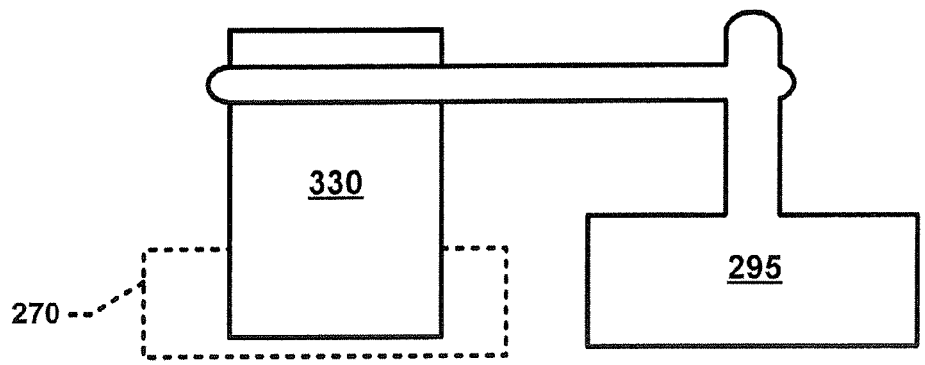

In general, a telecommunications cabinet includes a removable outer housing which can be replaced when damaged (e.g., see 292 of FIG. 4) without adjusting the cabling or replacing other internal components within the cabinet. For example, FIG. 2 is a schematic diagram of an example telecommunications cabinet 200 including a cabinet housing 201 and internal components 300.

The diagram shows an exemplary cable routing scheme for the cabinet 200. As shown at FIG. 2, a feeder cable 320 is initially routed into the cabinet 200 through a cable access region 230 of the cabinet housing 201. In certain embodiments, the fibers of the feeder cable 320 can include ribbon fibers. An example feeder cable 320 may include twelve to forty-eight individual fibers connected to a service provider central office 101 (FIG. 1).

In some embodiments, after entering the cabinet housing 201, the fibers of the feeder cable 320 can be routed to a feeder cable interface 312 (e.g., fiber optic adapter modules, a splice tray, etc.) at an interface location 302. At the feeder cable interface 312, the fibers of the feeder cable 320 are individually connected to separate splitter input fibers 322. The splitter input fibers 322 are routed from the feeder cable interface 312 to the splitter module housing 304.

At the splitter module housing 304, the splitter input fibers 322 are connected to separate splitter modules 314, wherein the input fibers 322 are each split into multiple pigtails 324, each having connectorized ends. In other embodiments, however, the fibers of the feeder cable 320 can be connectorized and can be routed directly to the splitter modules 314, thereby bypassing or eliminating the need for an intermediate feeder cable interface 312.

When the pigtails 324 are not in service, the connectorized ends can be temporarily stored on a storage module 316 that is mounted at the storage region 306 within the cabinet 201. When the pigtails 324 are needed for service, the pigtails 324 are routed from the splitter modules 314 to a termination module 318 that is provided at the termination region 308 within the cabinet 201.

In general, the termination panel 318 is the dividing line between the incoming fibers and the outgoing fibers. At the termination module 318, the pigtails 324 are connected to the fibers of an F2 distribution cable 326. The F2 distribution cable 326 can form the F2 portion of a network (see FIG. 1) and typically includes a plurality of fibers (e.g., 144, 216 or 432 fibers) that are routed from the cabinet 200 to subscriber locations 105.

In some embodiments, one or more of the fibers of the feeder cable 320 are not connected to any of the splitter modules 314. Rather, these fibers of the feeder cable 320 are connected to pass-through fibers 328 having connectorized ends. The pass-through fibers 328 can be connected to the termination modules 318, without first connecting to the splitter modules 314. By refraining from splitting a fiber 328, a stronger signal can be sent to one of the subscribers. The connectorized ends of the pass-through fibers 328 can be stored at the storage region 306 when not in use.

In general, telecommunications cabinet housings 201 configured in accordance with the principles of the present disclosure can be replaced (i.e., "reskinned") without disrupting the internal components 300 of the cabinet 201. This replacement feature is advantageous if the cabinet housing 201 ever becomes damaged (e.g., if the cabinet housing sustains structural damage due to a collision with an automobile).

Figure 3:
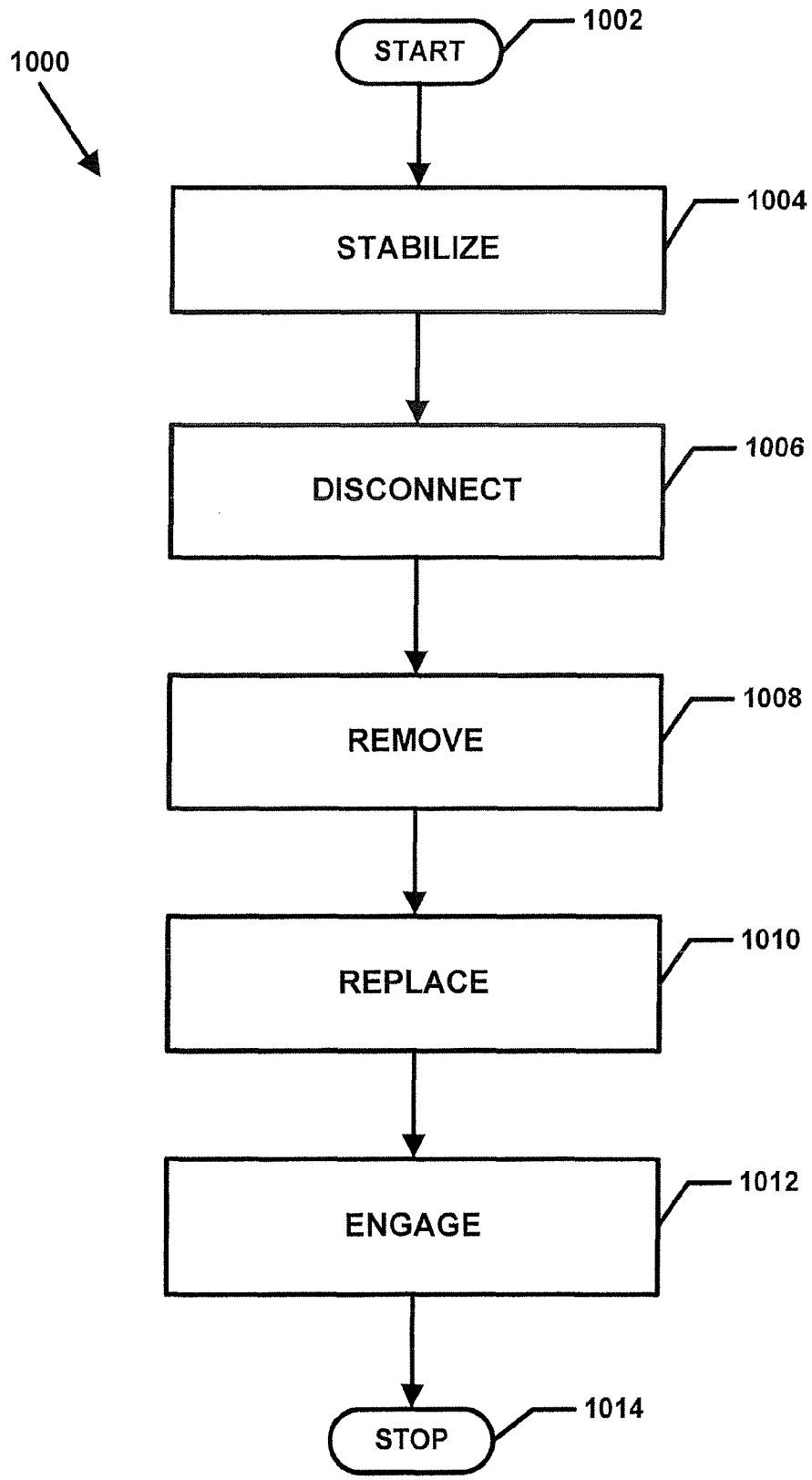
FIG. 3 illustrates an operational flow for an example replacement process for replacing the housing of a telecommunications cabinet without recabling the components within the cabinet in accordance with an embodiment of the present disclosure.

FIG. 3 illustrates an operational flow for an example replacement process 1000 for replacing the housing 201 of a telecommunications cabinet 200 without recabling the components 300 within the cabinet 200. FIGS. 4-9 illustrate some of the steps of the replacement process 1000. The process 1000 initializes and begins at a start module 1002 and proceeds to a stabilize operation 1004.

The stabilize operation 1004 couples a prop or support structure 295 to the internal components 300 of the cabinet 200 to maintain the components 300 in an upright or otherwise safe position. For example, if the internal components 300 are mounted to a frame 330 within the housing 201, then the stabilize operation 1004 can attach the frame 330 to a crane extending through an open doorway 210 or other opening defined in the cabinet housing 201 (see FIG. 5).

A disconnect operation 1006 disengages the internal components 300 from the cabinet housing 201. For example, the disconnect operation 1006 can uncouple the frame 330 from the remainder of the cabinet housing 201. If cables have been secured to the cabinet housing 201 (e.g., with cable ties or other attachment members), then disconnect operation 1006 uncouples the cables from the cabinet housing 201. The stabilize operation 1004 continues to maintain the internal components 300 in a safe position, even after they are disengaged from the cabinet housing 201.

A remove operation 1008 slides (or otherwise moves) the cabinet housing 201 away from the internal components 300, such as components and cables mounted to the frame 330. For example, the remove operation 1008 can slide the cabinet housing 201 along a direction D1 (see FIG. 6) until the internal components 300 have passed through the open doorway 210 of the cabinet housing 201. In an embodiment, a riser (i.e., an access compartment) 270 on which the cabinet housing 201 sits remains in place when the cabinet housing 201 is removed (see FIGS. 6 and 7). In another embodiment, the riser 270 also can be replaced.

Figure 8:
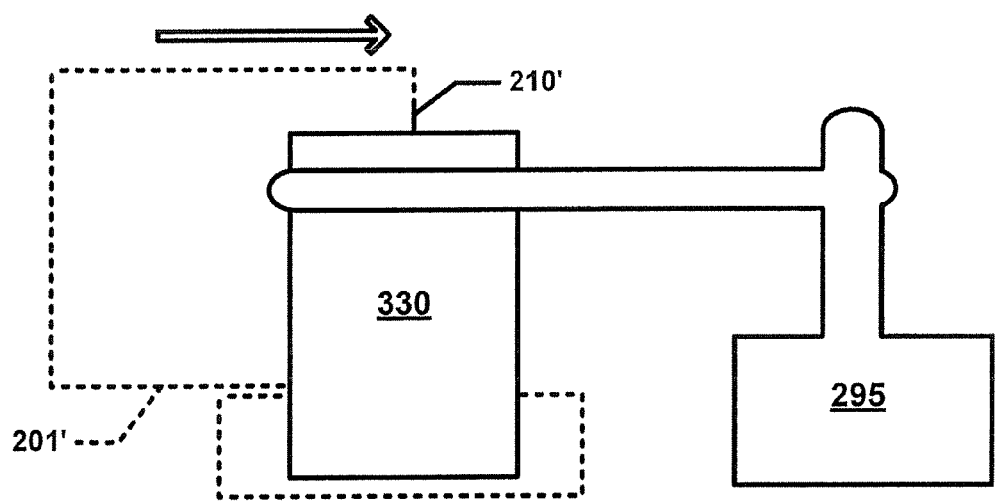
Figure 9:
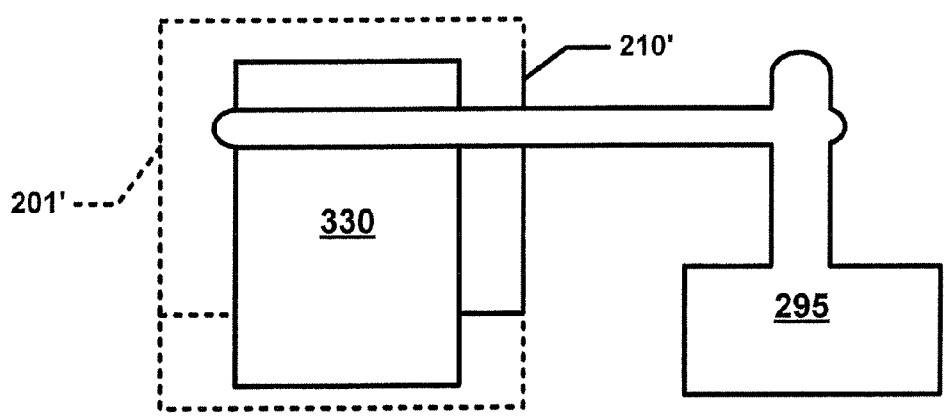

A replace operation 1010 installs a new or undamaged cabinet housing 201' around the internal components 300 (see FIG. 8). Typically, the new cabinet housing 201' also defines an opening (e.g., an open doorway) 210' through which the internal components 300 can pass when the new housing 201' is being installed. For example, the new cabinet 201' can be installed along a direction D2.

An engage operation 1012 couples the internal components 300 to the new cabinet housing 201'. For example, the engage operation 1012 can couple the frame 330 to the new cabinet housing 201' (see FIG. 9). In addition, cables connected to the components 300 can be reattached to the cabinet housing 201. The replacement process 1000 completes and ends at a stop module 1014.

Referring to FIGS. 10-25, a cabinet housing configured in accordance with the principles of the present disclosure is designed to be separable from the internal components 300, such as frame 330. The cabinet housing also can define an opening at a cable access region, through which cables enter and exit the cabinet. A removable panel arrangement can be provided to cover the opening at the cable access region to protect the internal components 300 of the cabinet housing from environmental contamination. The following describes some embodiments of panel arrangements having features that are examples of inventive aspects in accordance with the principles of the present disclosure.

FIGS. 10-13 show an FDH 400 that is an example of a telecommunications cabinet 200. The FDH 400 includes a cabinet housing 401 that contains internal components 300 as described above. In an embodiment, the cabinet housing 401 defines a cabinet interior in which the internal components 300 are mounted and can be accessed through an open front 403 (see FIG. 12). In an embodiment, the cabinet 400 also has an open rear 405 (see FIG. 11) through which the cabinet interior can be accessed.

Generally, the open front 403 is covered by at least one door 410. In an embodiment, the open front 403 is covered by a first door 410 and a second door 412 (see FIG. 10). The doors 410, 412 pivot from a closed position, in which the doors 410, 412 cover the open front 403, to an open position to facilitate access through the open front 403 to the internal components 300 mounted within cabinet interior. In an embodiment, at least one of the front doors 410, 412 includes a lock 411. In an embodiment, the open rear 405 can be similarly covered.

The cabinet housing 401 includes a cable access region 430 (FIG. 12) defining an opening through which cables (e.g., main or feeder cable 320, subscriber cables 326, etc.) can enter and exit the interior of the cabinet housing 401. The cable access region 430 has a closed side 432 and an opposite open side 434. The open side 434 extends along the open rear 405 of the cabinet housing 401. Typically, the cable access region 430 is defined in a bottom panel 404 of the cabinet housing 401. In other embodiments, however, the cable access region 430 also can be provided in a rear panel (not shown), a top panel 402, or in a side panel 406, 408 of the cabinet housing 401.

A frame 330 is installed within the interior of the cabinet housing 401 to support mounting of the internal components 300. In the example shown in FIG. 12, the frame 330 includes a first frame member 332 extending between the top and bottom panels 402, 404 at a first side 408 of the cabinet interior, a second frame member 334 positioned at a central location within the cabinet interior, and a third frame member 336 positioned at the opposite side 406 of the cabinet interior. The frame members 332, 334, 336 each include flanges 331 by which the frame members 332, 334, 336 can be coupled to the cabinet housing 401. For example, the flanges 331 can define apertures through which fasteners can extend. In other embodiments, however, the internal components 300 can be installed within the cabinet housing 401 using any desired mounting arrangement.

Figure 11:
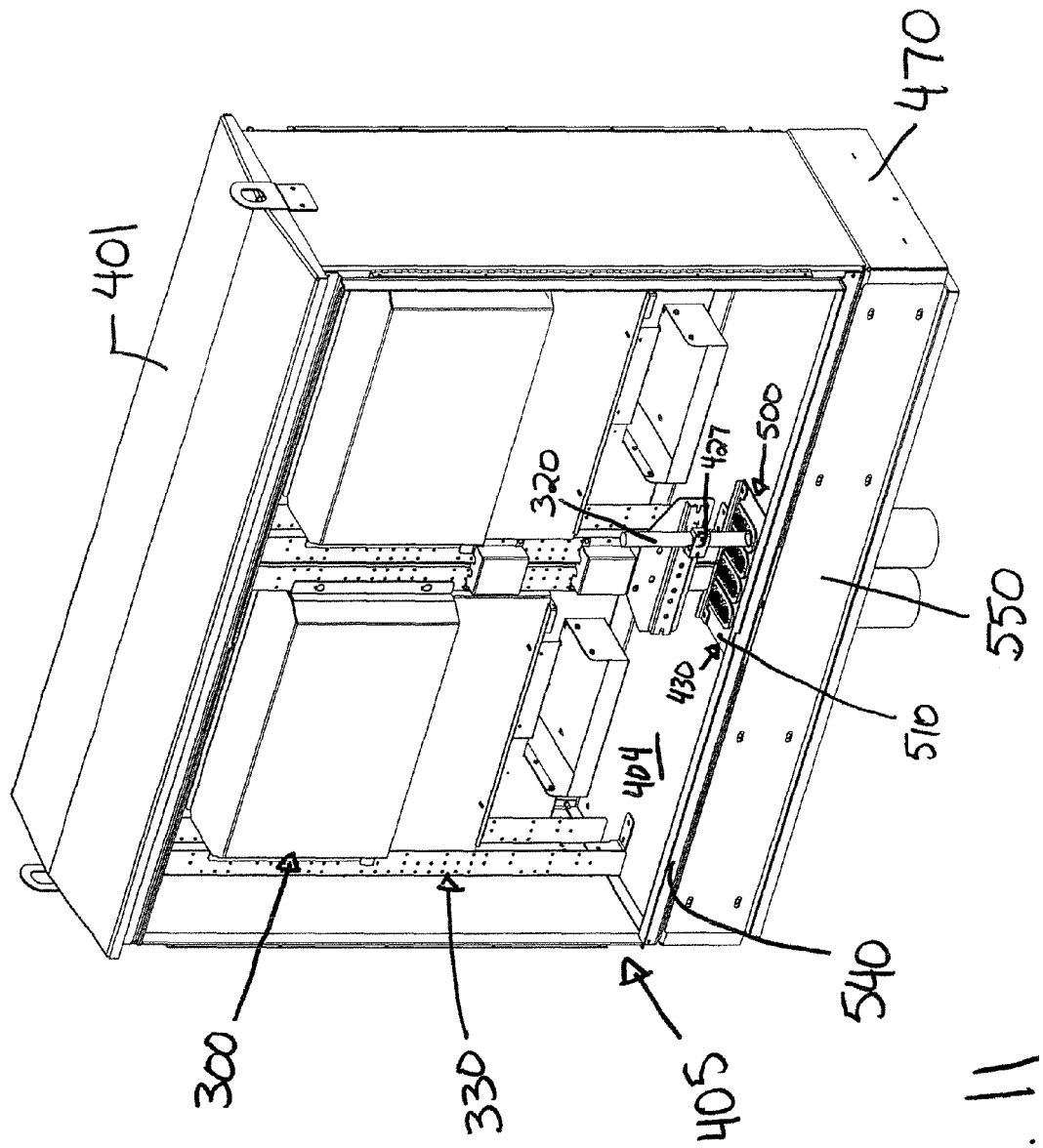
FIG. 11 is a rear perspective view of the telecommunications cabinet of FIG. 10 with rear doors and internal components removed in accordance with an embodiment of the present disclosure.

The internal components 300 can be mounted to the frame members 332, 334, 336 or to panels 333 extending between the frame members 332, 334, 336. For example, in the embodiment shown, a securement panel 335 is coupled to the bottom of the second frame member 334. Cable management devices, such as cable clamps 427 (FIG. 11), can be coupled to at least one side of the securement panel 335. In an embodiment, the cable management devices 427 are provided on both sides of the securement panel 335 (e.g., see FIG. 26). Typically, the securement panel 335 is arranged adjacent the cable access region 430. Telecommunications cables (e.g., the feeder cables 320 and subscriber cables 326) extend through the cable access region 430 from outside the cabinet housing 401 and couple to the securement panel 335 using the cable management devices 427 (FIG. 11).

A panel arrangement 500 (e.g., see FIG. 13) is provided over the cable access region 430 to seal the internal components 300 of the cabinet housing 401 from the exterior of the cabinet housing 401. The panel arrangement 500 is removably coupled to the cabinet housing 401 to cover the opening defined in the cable access region 430. In general, the panel arrangement 500 includes at least one panel 510 defining one or more apertures through which cables (e.g., feeder cables 320, subscriber cables 326, or stub cables) can extend (see FIG. 11).

Figure 13:
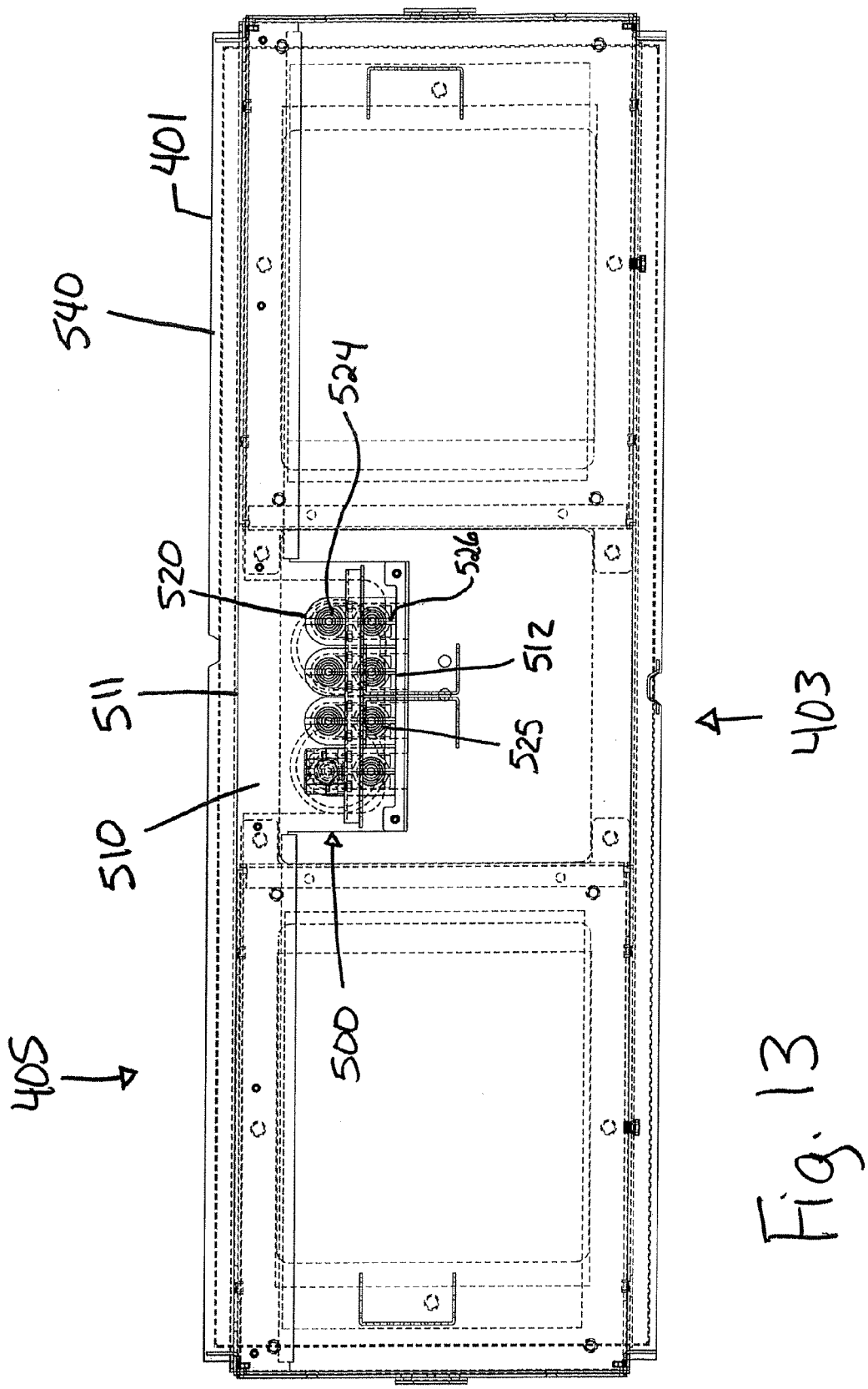
FIG. 13 is a top view of the telecommunications cabinet of FIG. 11 with the top panel of the cabinet removed in accordance with an embodiment of the present disclosure.

The example panel arrangement 500 shown in FIG. 13 includes a base panel 510 defining one or more gasket regions 520 having a closed end 511 and an open end 512. For example, in FIG. 13, the base panel 510 defines four open-sided gasket regions 520. The base panel 510 is installed over the cable access region 430 by positioning the base panel 510 so that the closed end 511 of the gasket region 520 and the closed side 432 of the access region 430 cooperate to form one or more apertures through which cables can extend. For example, the open end 512 of the gasket region can be slid towards the open side 434 of the cable access region 430 until the base panel 510 is arranged in position over the access region 430.

In an embodiment, each gasket region 520 can retain a grommet 525 to seal the interior of the cabinet housing 401 from the exterior. In the example shown in FIG. 13, each grommet 525 defines two apertures through which cables can extend. In other embodiments, however, each grommet 525 can define any number of one or more apertures. In the example shown, the grommet 525 is formed with concentric rings 524 to define the edges of the aperture.

Each grommet 525 also defines a slot 526 extending through the grommet 525 to the open side 512 of the gasket region 520 to connect the apertures with an exterior of the base panel 510. In general, the grommet 525 is sufficiently flexible to enable cables to be slid through the slot 526 and into the apertures during installation of the base panel 510. For example, in FIG. 13, the grommet 525 defines a slot 526 extending from the open end 512 of the gasket region 520 to a center of the rear-most aperture. In an embodiment, the grommet 525 can be perforated to enable a technician to cut or break the grommet 525 to form the slot 526 and/or apertures when the cables are installed.

Figure 12:
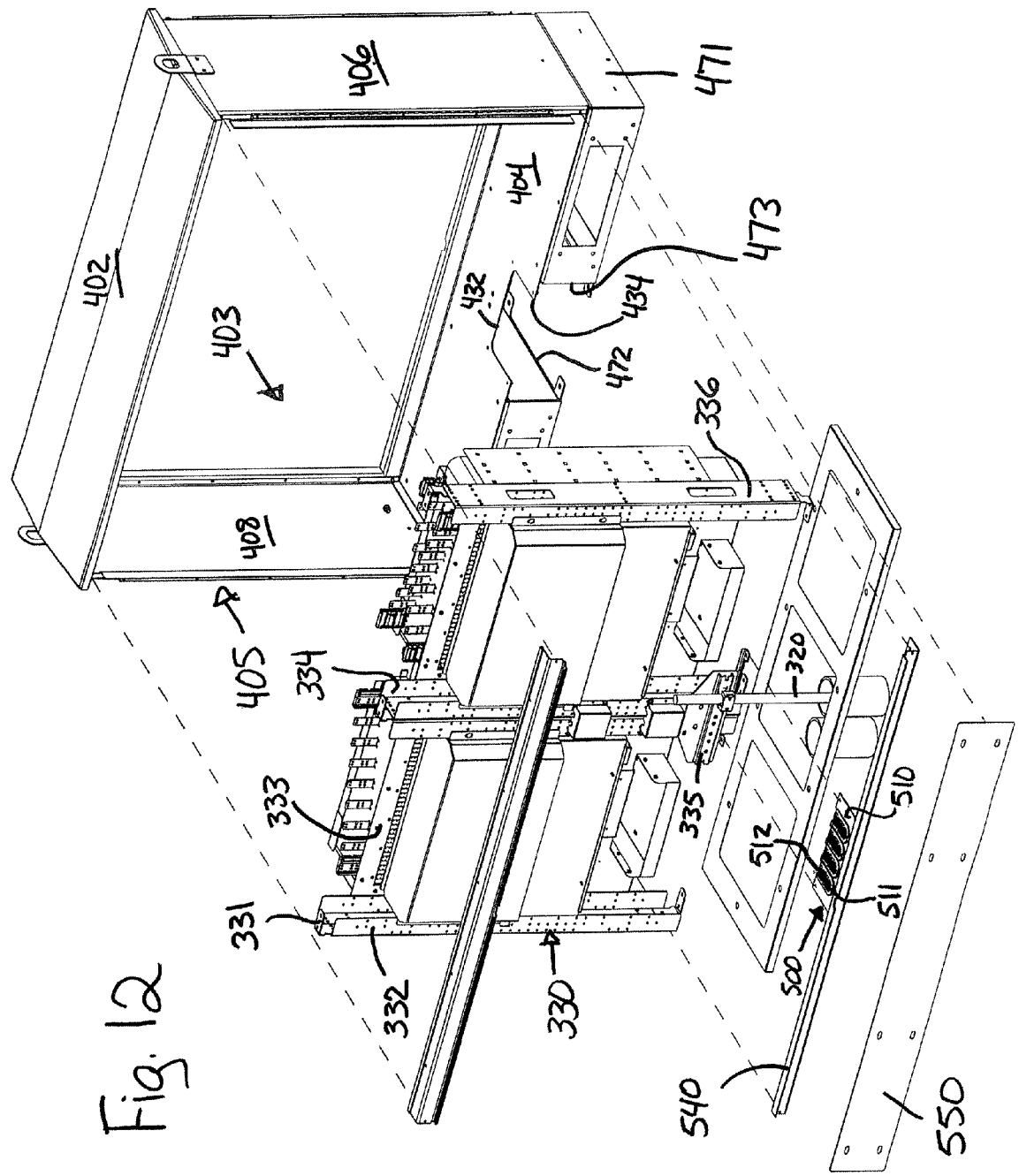
FIG. 12 is an exploded view of the telecommunications cabinet of FIG. 11 in accordance with an embodiment of the present disclosure.

In some embodiment, a lip 540 extends upwardly from the rearward edge of the bottom panel 404 of the cabinet housing 401 (see FIGS. 11 and 12). In an embodiment, the lip 540 is generally L-shaped. The lip 540 inhibits slack length of optical fibers (e.g., the optical fibers cabled between the internal components 300) from spilling out through the open rear 450 from the interior of the cabinet 401. Typically, the lip 540 is removably coupled to the cabinet housing 401. In an embodiment, the lip 540 can be fastened (i.e., fixedly or removably) to the panel arrangement 500 (see FIG. 12). For example, the base panel 510 and the lip 540 can each define apertures through which bolts, screws, or other fasteners can extend to secure the pieces together (see FIG. 13).

Figure 10:
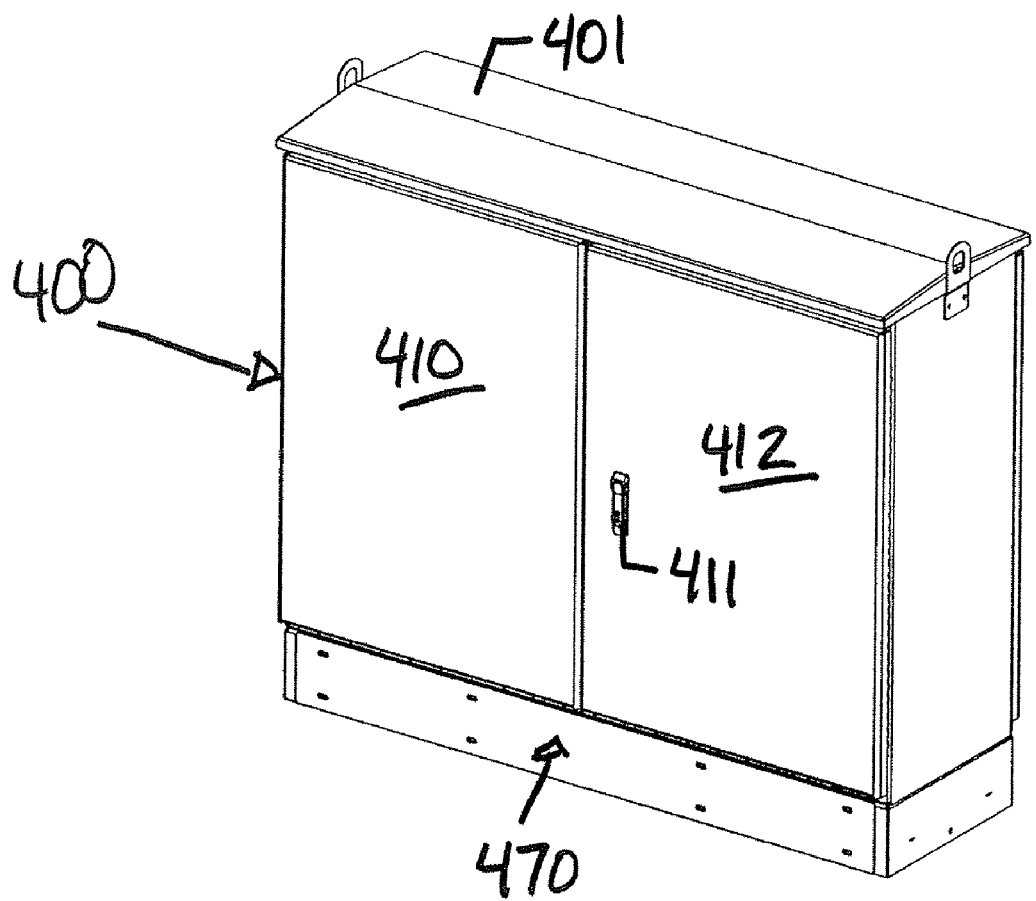
FIG. 10 is a perspective view of an example telecommunications cabinet having front doors arranged in a closed position in accordance with an embodiment of the present disclosure.

In some embodiments, the FDH 400 can mount to an access compartment (i.e., or riser) 470 (see FIG. 10). The access compartment 470 includes a housing 471 defining an open interior 472 (see FIGS. 12 and 18). The housing 471 can define an interrupted wall 473 (see FIG. 12) through which the open interior 472 can be accessed. A cover 550 can be removably coupled to the housing 471 to extend over the interrupted portion of the wall 473 (see FIG. 11). Removing the cover 550 provides access to the interior 472 of the access compartment. The open interior 472 also is accessible through the cable access region 430 defined in the cabinet housing 401 when the cabinet housing 401 is mounted to the access compartment 470.

The cables entering and exiting the cabinet housing 401 pass through the panel arrangement 500 covering the cable access region 430 and into and/or through the interior 472 of the access compartment 470. In an embodiment, the fibers of the feeder cable 320 and the subscriber cable 326 are optically coupled to stub cable fibers exiting the cabinet housing 401 within the access compartment 470. Further details regarding exemplary access compartments can be found in copending application Ser. No. 11/544,951, filed OCTOBER 6, 2006, and entitled "FIBER DISTRIBUTION HUB WITH OUTSIDE ACCESSIBLE GROUNDING TERMINALS," the disclosure of which is hereby incorporated by reference.

Figure 14:
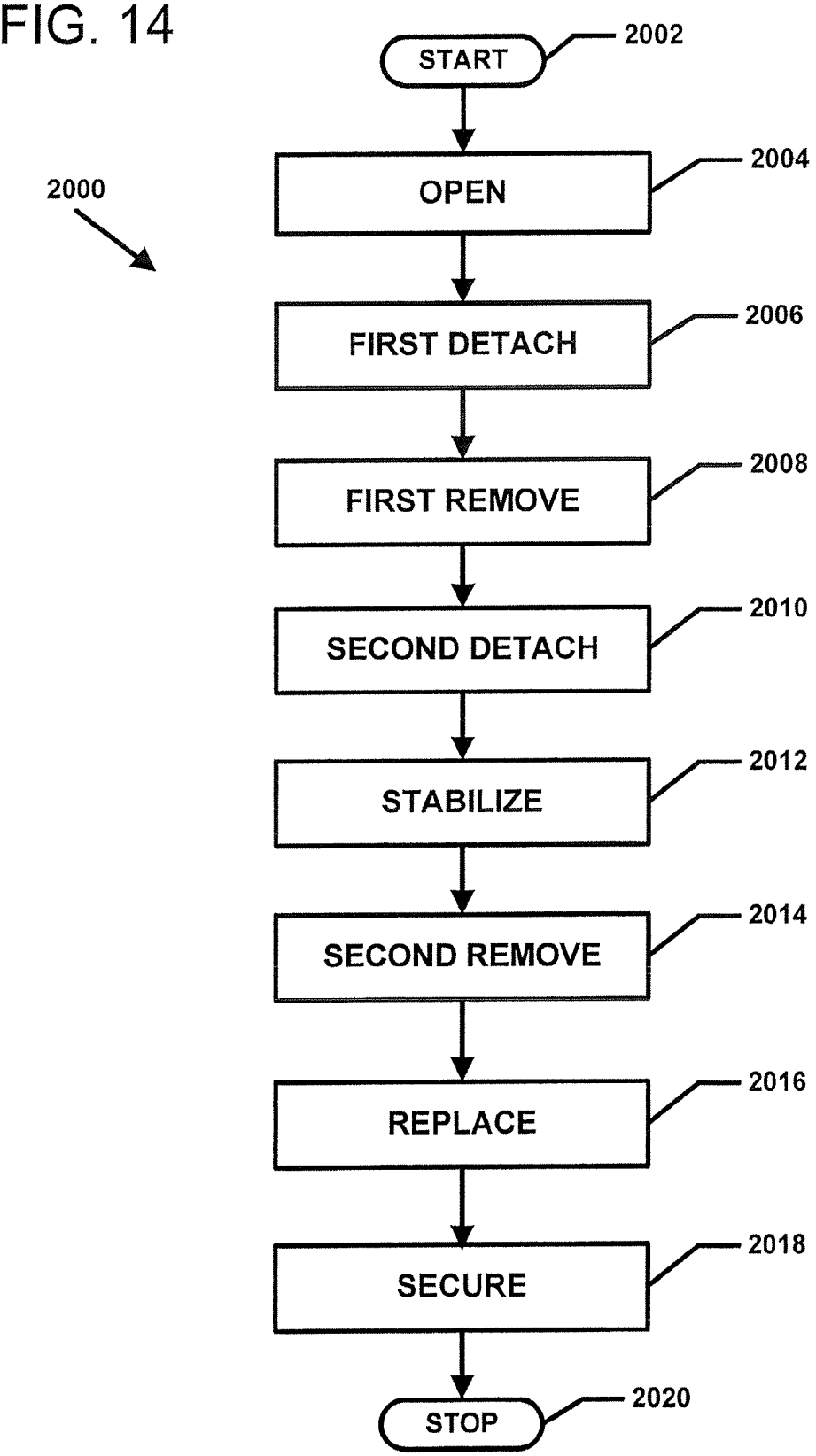
FIG. 14 illustrates an operational flow for an example replacement process for replacing the cabinet housing of a FDH in accordance with an embodiment of the present disclosure.
Figure 15:
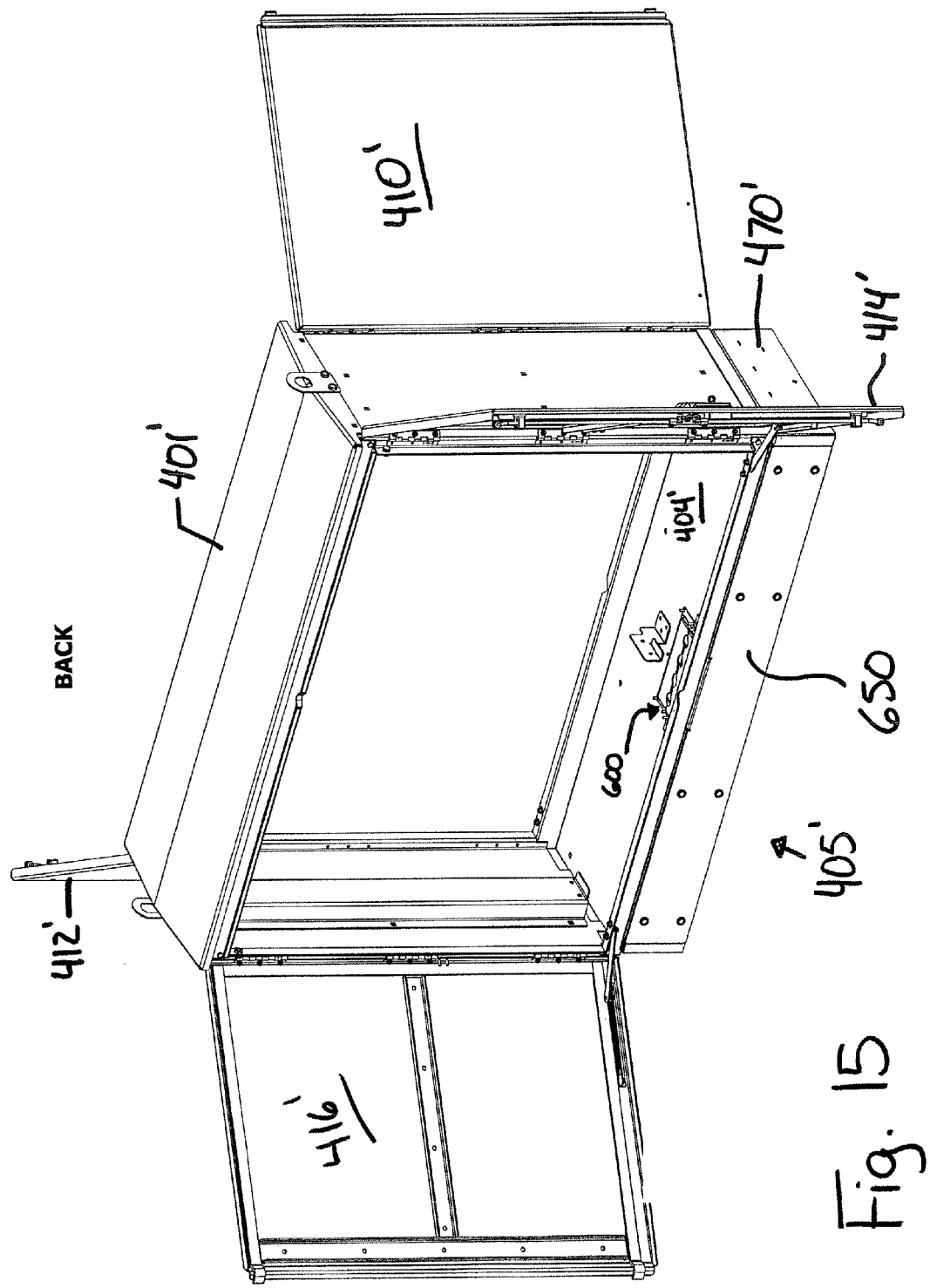
FIG. 15 is a top, rear perspective view of a telecommunications cabinet having front and rear doors arranged in an open position and internal components removed in accordance with an embodiment of the present disclosure.
Figure 16:
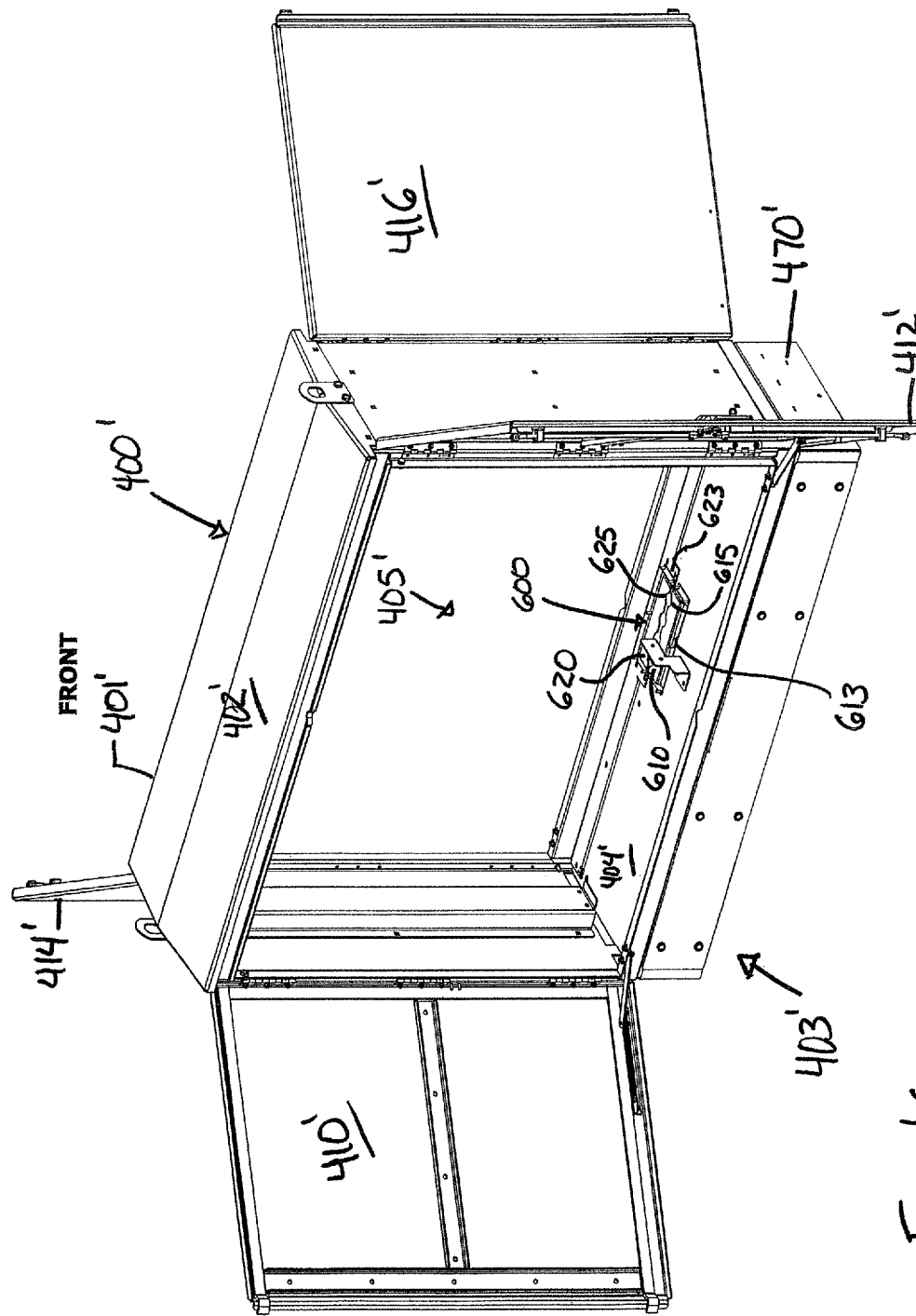
FIG. 16 is a top, front perspective view of the telecommunications cabinet of FIG. 15 in accordance with an embodiment of the present disclosure.

FIG. 14 illustrates an operational flow for an example replacement process 2000 for replacing the cabinet housing 401 of a FDH 400. The replacement process 2000 initializes and begins at a start module 2002 and proceeds to an open operation 2004. The open operation 2004 pivots open the door covering the open rear 405 (i.e., or the open front 403) to access the interior of the cabinet housing 401.

A first detach operation 2006 uncouples the panel arrangement 500 from the cabinet housing 401. For example, in an embodiment, the first detach operation 2006 can remove the fasteners from the panel arrangement 500. The first detach operation 2006 also can uncouple the lip 540 from the cabinet housing 401 (e.g., by removing fasteners attaching the lip 540 to the cabinet housing 401). Optionally, the panel arrangement 500 can be uncoupled from the lip 540. In an embodiment, the first detach operation 2006 also removes the fasteners attaching the cover 550 to the access compartment 470.

A first remove operation 2008 removes the panel arrangement 500 from the cabinet housing 401 to expose the opening defined by the cable access region 430. For example, the first remove operation 2008 can slide the base panel 510 away from the cables extending through the grommet apertures. The cables pass through the slots 526 defined in the grommets 525 and past the open end 512 of the grommet region 520 as the base panel 510 is removed.

The first remove operation 2008 also can remove the lip 540 from the cabinet housing 401. For example, if the base panel 510 is fixedly secured to the lip 540, then removing the lip 540 also removes the base panel 510 (see FIG. 12). Removing the panel arrangement 500 and the lip 540 joins the opening defined in the cable access region 430 with the open rear 405 of the cabinet housing 401 (see FIG. 12). In an embodiment, the first remove operation 2008 also removes the cover 550 from the interrupted wall 473 of the access compartment housing 471 to join the open interior 472 with the open rear 405 (see FIG. 12).

Figure 27:
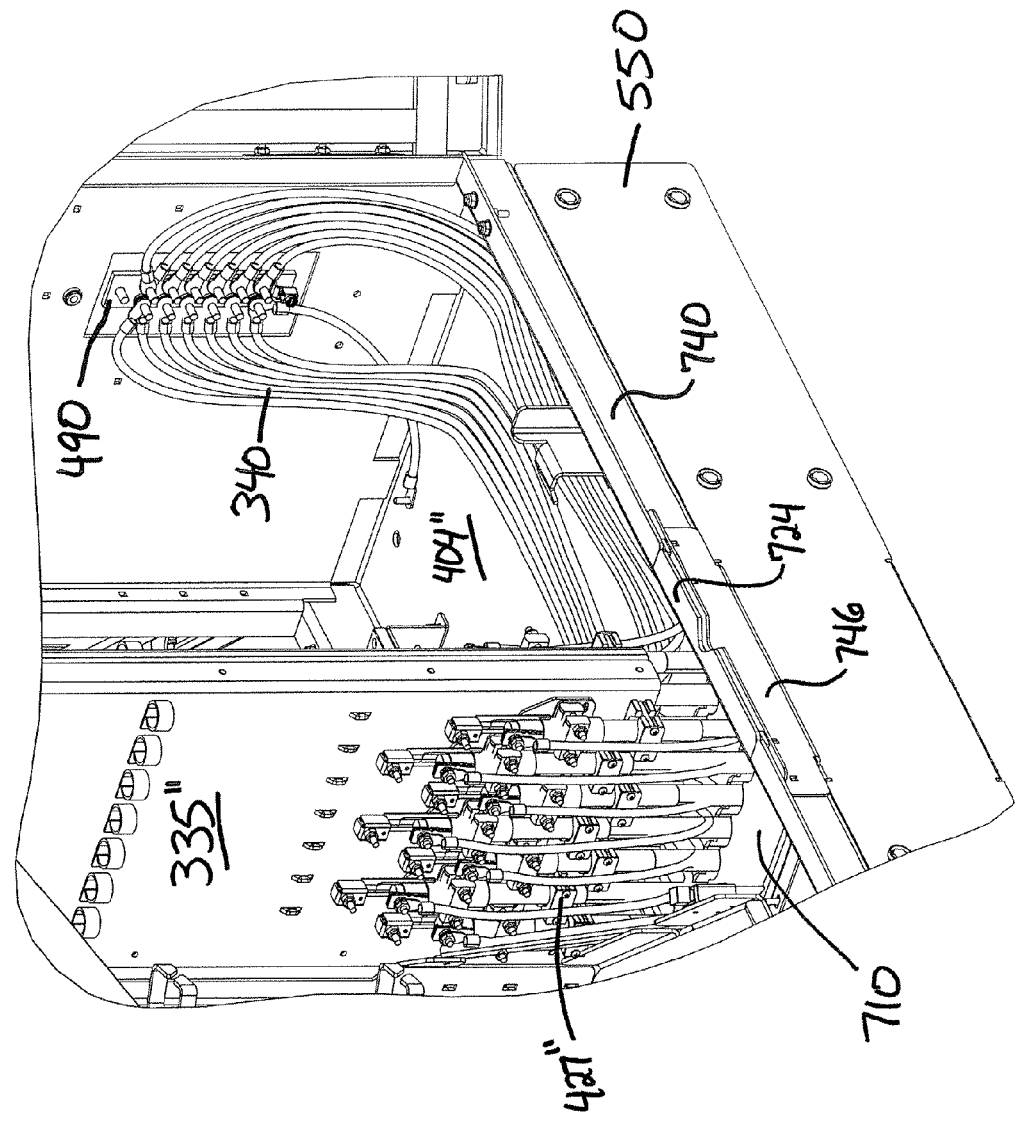
FIG. 27 is another partial view of the rear of the telecommunications cabinet of FIG. 21 showing grounding wires extending from the cables to a grounding plate in accordance with an embodiment of the present disclosure.

A second detach operation 2010 uncouples the cables and other internal components 300 from the cabinet housing 401. In an embodiment, the second detach operation 2010 uncouples the frame 330 from the interior of the cabinet housing 401. For example, the frame members 332, 334, 336 can be detached from the cabinet housing 401 by removing fasteners from the flanges 331 of the frame members 332, 334, 336. Panels 333 holding internal components 330 can remain attached to the frame members 332, 334, 336. The cables can remain attached to the securement panel 335. In an embodiment, grounding wires 340 (see FIG. 21) extending between the cables coupled to the securement panel 335 and a grounding plate 490 (FIG. 27) also can be removed.

A stabilize operation 2012 props or otherwise maintains the frame 330 and the internal components 300 of the FDH 400 in an upright or otherwise safe position while disengaged from the cabinet housing 401. For example, the frame 330 and the components 300 can be secured temporarily to a crane, external frame, or other structure. Alternatively, a technician can reach through the open front 403 (i.e., or open rear 405) and hold the frame 330 and/or components 300 in place.

A second remove operation 2014 slides (or otherwise moves) the cabinet housing 401 away from the frame 330 and internal components 300. For example, the second remove operation 2014 can slide the cabinet housing 401 forwardly of the access compartment 470 until the internal components 300 have passed through the open rear 405 and cleared the cabinet housing 401.

In some embodiments, the second remove operation 2014 also can slide (or otherwise move) the access compartment 470 out from the internal components 300. For example, the second remove operation 2014 can slide the access compartment 2014 forwardly to enable the cables to pass through the interruption in the wall 473 of the access compartment housing 471. In other embodiments, only the cabinet housing 401 is removed. In yet another embodiment, only the access compartment 470 is removed during the second remove operation 2014.

A replace operation 2016 installs a new cabinet housing around the internal components 300. Typically, the new cabinet housing also includes an open rear (i.e., or open front) continuous with an open end of a cable access region through which the cables can pass when the new housing is being installed. In an embodiment, the new cabinet housing is mounted to the access compartment 470. If the access compartment 470 was removed in the second remove operation 2014, however, then the replace operation 2016 can install a new access compartment around the cables. The new cabinet housing is then mounted to the new access compartment. Alternatively, the replace operation 2016 can replace the access compartment 470 instead of replacing the cabinet housing 401.

A secure operation 2018 reinstalls the frame 330, internal components 300, the panel arrangement 500, and the lip 540 to the new cabinet housing. For example, the secure operation 2018 can fasten the frame members 332, 334, 336 to the new cabinet housing. The secure operation 2018 also can position (e.g., slide) the base panel 510 within the cabinet interior so that the cables within the cabinet housing 401 pass through the open end 512 of the gasket region 520 and the slots 526 of the grommets 525 and into the grommet apertures. The secure operation 2018 also can fasten the new cabinet housing to the access compartment. The cover 550 can be installed to cover the interruption on the access compartment. The replacement process 2000 completes and ends at a stop module 2020.

Referring now to FIGS. 15-18, another embodiment of a panel arrangement 600 is shown installed in another FDH 400'. The panel arrangement 600 is provided over a cable access region 430' (FIG. 17) to seal the internal components 300 of the FDH 400' from the exterior of the FDH 400'. The cable access region 430' also has a closed end 432' and an open end 434'. The open end 434' extends along a portion of an open rear 405' of the cabinet housing 401' (see FIG. 17).

The panel arrangement 600 is removably coupled to the cabinet housing 401' at the cable access region 430'. In general, the panel arrangement 600 includes multiple pieces that cooperate to form a set of one or more apertures (best seen in FIG. 15) through which cables (e.g., feeder cables 320 and subscriber cables 326) can extend through the cable access region 430'. At least one piece of the panel arrangement 600 defines a closed end which can be arranged opposite the closed end 432' of the access region 430' to close the cable access region 430' from the open rear 405' of the cabinet housing 401'.

The example panel arrangement 600 shown in FIGS. 15-18 includes a first panel 610 and a second panel 620. The inside edge 615, 625 of each panel 610, 620, respectively, defines one or more concave slots. When the panels 610, 620 of the panel arrangement 600 are installed, the concave slots of the first panel 610 cooperate with the concave slots on the second panel 620 to form the set of openings through which fiber optic cables can extend. In other embodiments, however, the panel arrangement 600 can form a single opening or can form multiple sets of openings depending on different panel geometries. Gaskets (not shown) can be arranged within the openings to provide an environmental seal around the cables extending through the panel arrangement 600.

In the example shown, the first panel 610 is arranged forward of the second panel 620, which closes the cable access region 430'. The row of openings defined by the first and second panels 610, 620 extend parallel to the open front 403' and the open rear 405' of the cabinet housing 401'. In another embodiment, the panel arrangement 600 can be configured to form a row of openings extending between the open front 403' and the open rear 405'. In other embodiments, the panel arrangement 600 can be configured to form any desired pattern of openings.

The first and second panels 610, 620 have a fastening section 613, 623, respectively, extending along their outer edges. The fastening section 613 of the first panel 610 can be secured to the interior of the cabinet housing 401'. For example, the fastening section 613 of the first panel 610 can be fastened to the bottom panel 404' of the cabinet housing 401' via screws, bolts, or other fasteners. The fastening section 623 of the second panel 620 can be secured to the bottom panel 404' or to the lip 640 coupled to the cabinet housing 401'.

Figure 17:
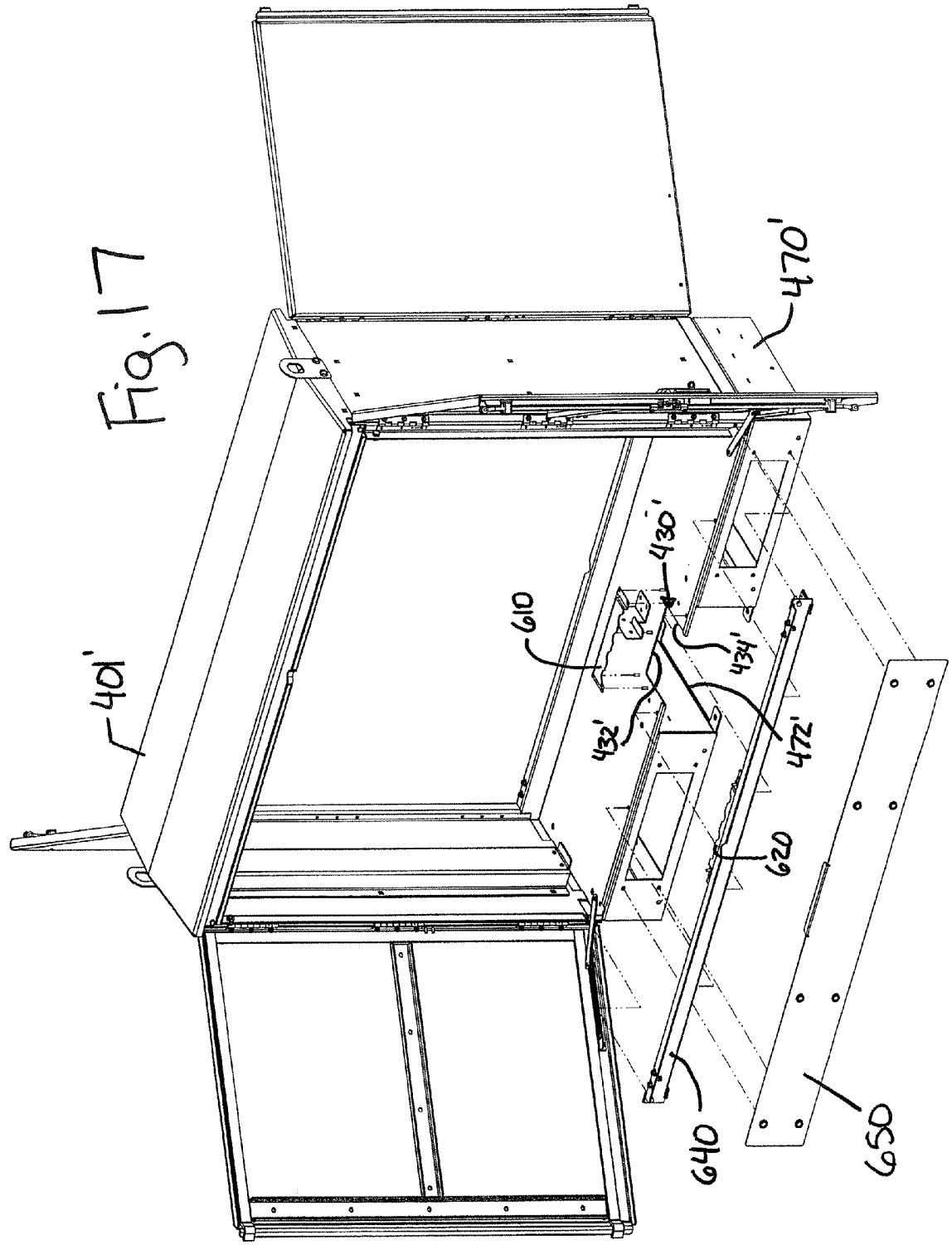
FIG. 17 is a partially exploded view of the telecommunications cabinet of FIG. 16 in accordance with an embodiment of the present disclosure.
Figure 18:
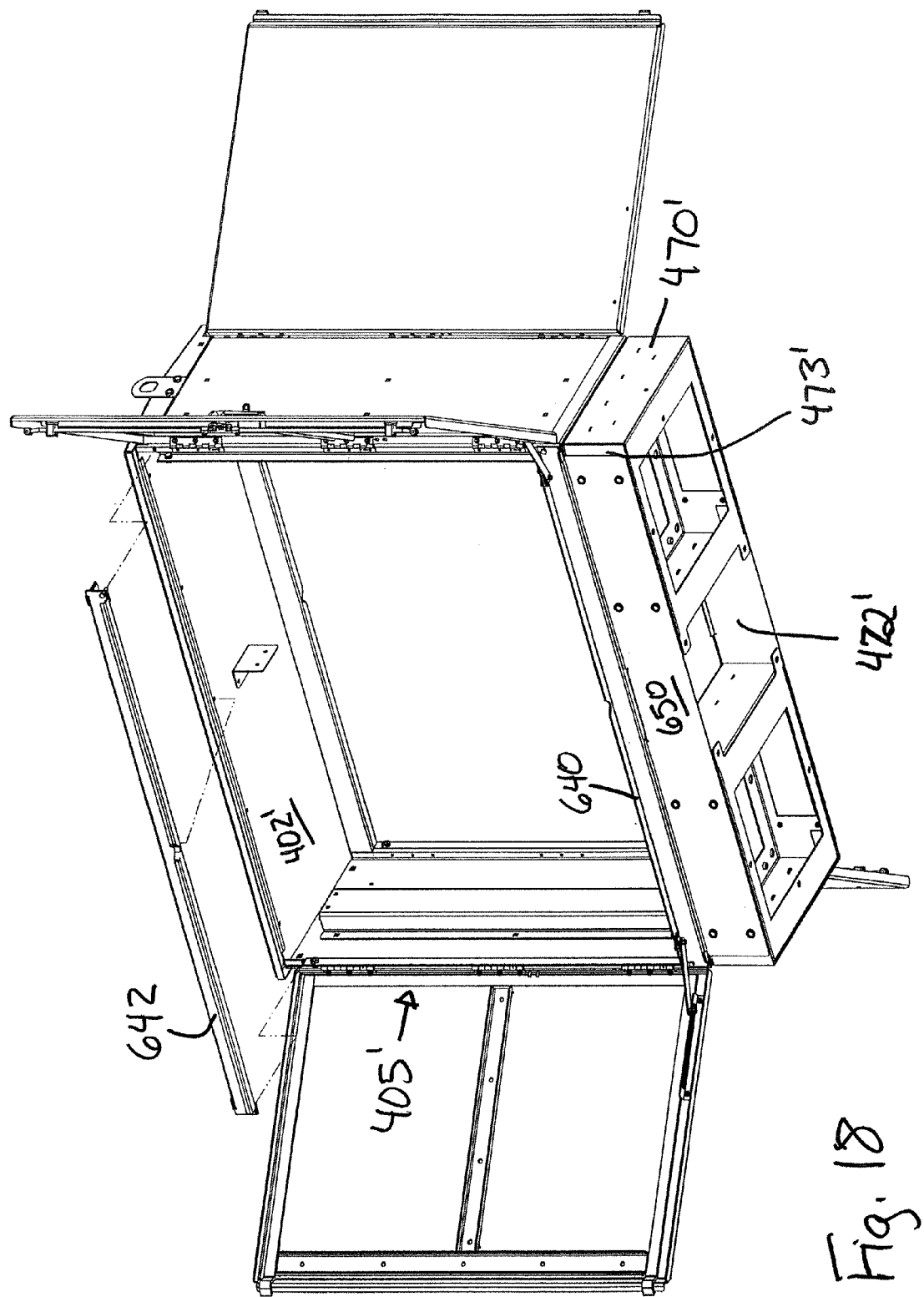
FIG. 18 is a bottom, rear perspective view of the telecommunications cabinet of FIG. 16 with a lip exploded from a top portion of the cabinet in accordance with an embodiment of the present disclosure.

The panel arrangement 600 and lip 640 can be removed to expose the open end 434' of the access region 430' of the cabinet housing 401' (FIG. 17). Exposing the access region 430' facilitates removal and replacement of the cabinet housing 401', e.g., using the replacement process 2000 of FIG. 14. A second lip 642 also can be removed from the cabinet housing 401' (FIG. 18). A cover 650 can be removed to expose an open interior 472' of the access compartment 470' to facilitate replacing the access compartment 470' as described above with reference to access compartment 470 (FIG. 17).

Figure 19:
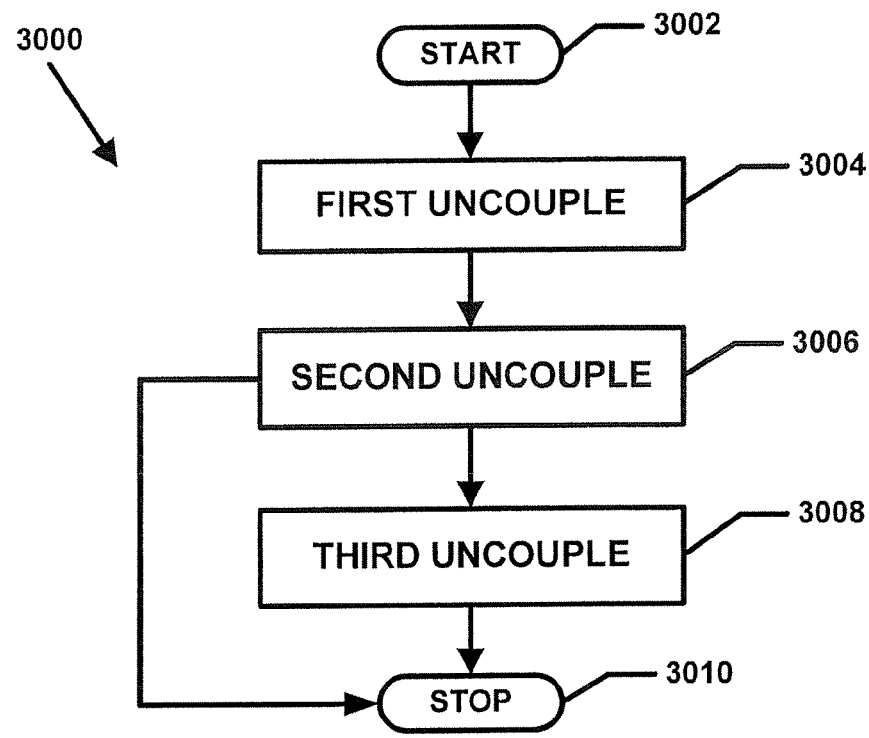
FIGS. 19 and 20 are flowcharts illustrating how the first detach step and the first remove step of the replacement process of FIG. 14 can be implemented using the panel arrangement shown in FIGS. 15-18 in accordance with an embodiment of the present disclosure.
Figure 20:
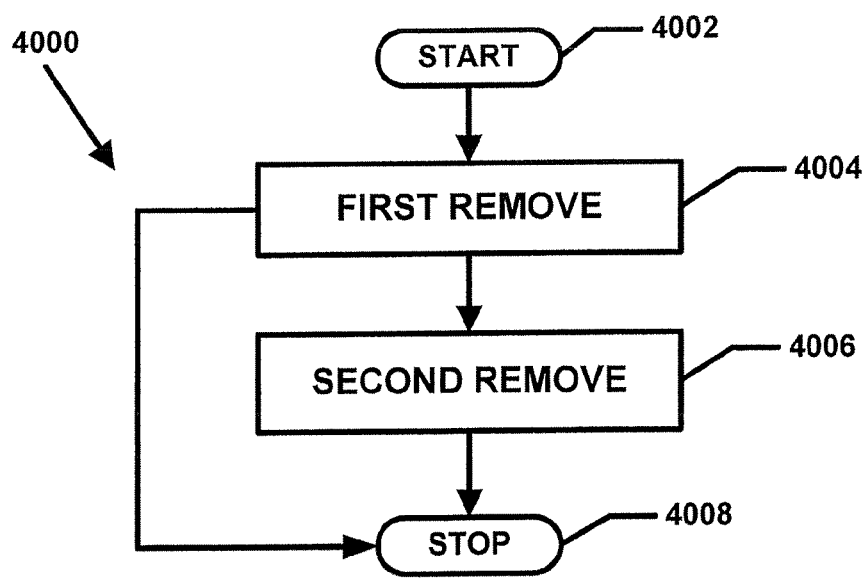
Figure 21:
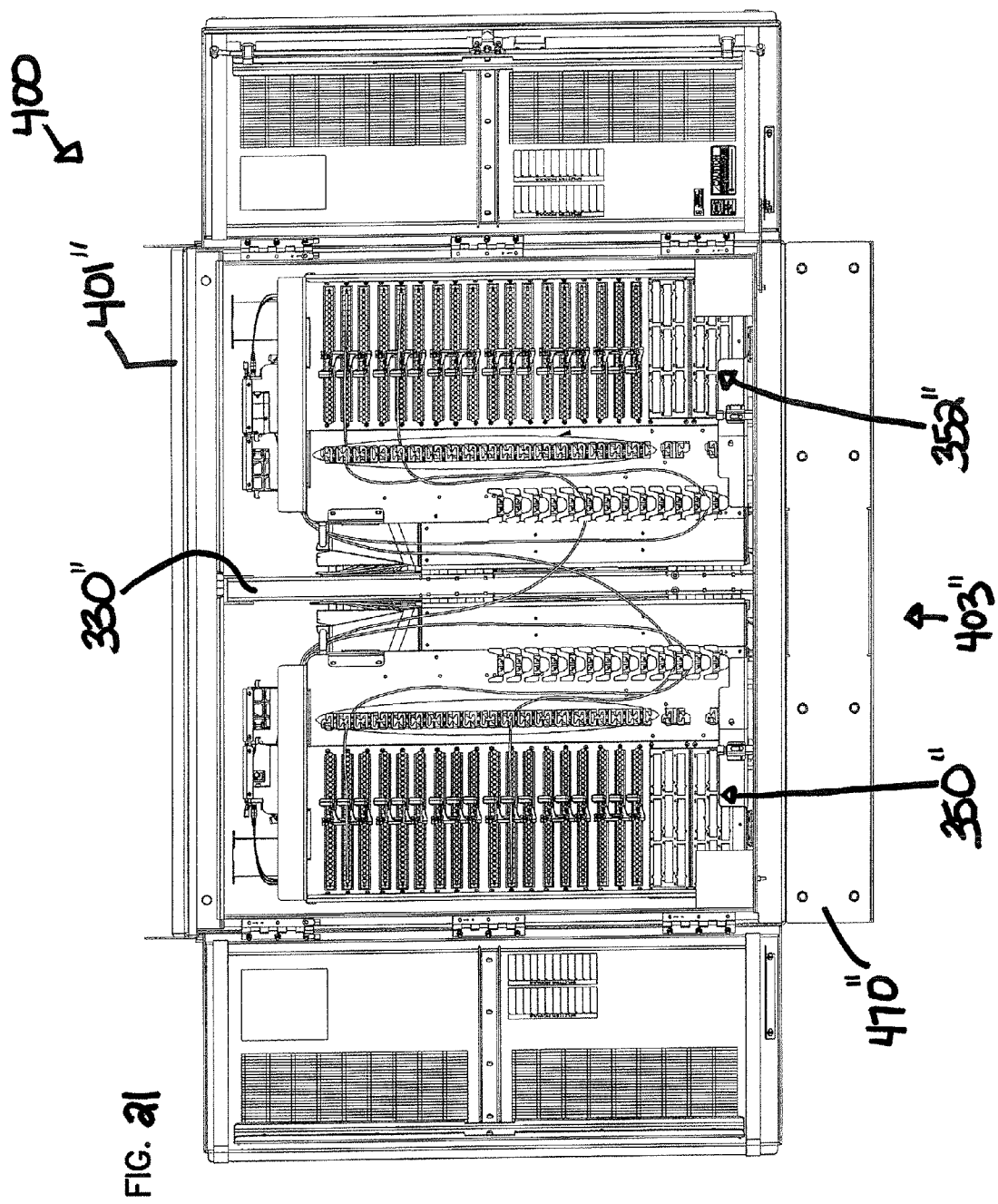
FIG. 21 is a front view of another example of a telecommunications cabinet having features that are examples of inventive aspects in accordance with the principles of the present disclosure.
Figure 2A:
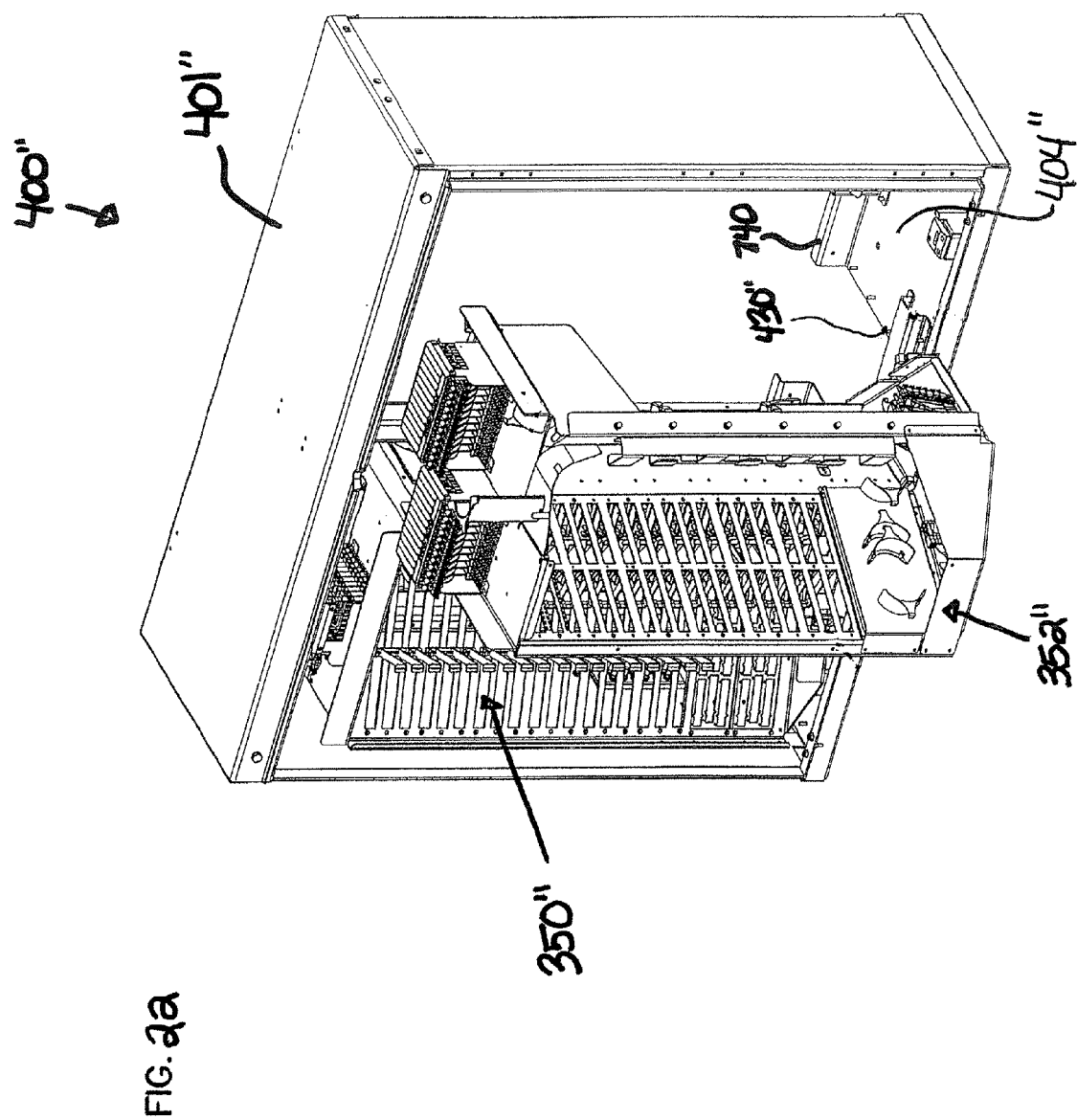

FIGS. 19 and 20 are flowcharts illustrating how the first detach step 2006 and the first remove step 2008 of the replacement process 2000 can be implemented using the panel arrangement 600. FIG. 19 illustrates an example detach process 3000 that initializes and begins at a start module 3002 and proceeds to a first uncouple operation 3004. The first uncouple operation 3004 removes the fasteners from at least the second panel 620. The first uncouple operation 3004 also can remove the fasteners from the first panel 610. Alternatively, the first panel 610 can remain secured to the cabinet housing 401.

A second uncouple operation 3006 removes fasteners from the lip 640 to uncouple the lip 640 from the cabinet housing 401'. The second uncouple operation 3006 also can remove fasteners from the second lip 642 coupled to a rearward edge of the top panel 402' of the cabinet housing 401' (see FIG. 18). Typically, the second lip 642 has the same general shape of the first lip 640. The second lip 642 can be removed from the cabinet housing 401' to facilitate sliding the top of the cabinet housing 401' over/past the internal components 300.

An optional third uncouple operation 3008 removes fasteners from the cover 650 extending over a rear of the access compartment 470'. When fastened, the cover 650 inhibits access to the open interior 472' of the access compartment 470'. Typically, the third uncouple operation 3008 is performed if the access compartment 470' is being replaced along with or instead of the cabinet housing 401'. The detach process 3000 completes and ends at a stop module 3010.

FIG. 20 illustrates a remove process 4000 that initializes and begins at a start module 4002 and proceeds to a first disconnect operation 4004. The first disconnect operation 4004 removes at least the second panel 620 and the lip 640 from the cabinet housing 401'. For example, if the second panel 620 is attached to the lip 640, then the second panel 620 can be removed by moving the lip 640 rearwardly of the cabinet housing 401' (see FIG. 17).

The first disconnect operation 4004 also can remove the second lip 642 from the cabinet housing 401' (see FIG. 18). In an embodiment, the first disconnect operation 4004 also can optionally remove the first panel 610 from the cabinet housing 401'. In some embodiments, the remove process 4000 can complete and end at a stop module 4008. In other embodiments, however, the remove process 4000 proceeds to a second remove operation 4006.

The second remove operation 4006 pulls off the cover 650 of the access compartment 470' to reveal the open interior 472' of the access compartment 470'. Removing the cover 650 provides a continuous opening through which the cables 320, 326 can pass when the access compartment 470' is removed and replaced. The continuous opening is defined by the open rear 405', the access region 430', and the open interior 472'. The remove process 4000 then completes and ends at stop module 4008 as disclosed above.

The remainder of the replace process 2000 can be performed substantially as described above. The cabinet housing 401' is removed by sliding the cabinet housing 401' forwardly of the internal components 300. In an embodiment, the access compartment 470' also can be removed by sliding the access compartment 470' forwardly, thereby causing the cables 320, 326 to pass through the open interior 472' of the access compartment 470' as well as through the open rear 405' of the cabinet housing 401'.

A new cabinet housing and/or a new access compartment can be installed around the internal components 300 and cables 320, 326. After the new cabinet and/or access compartment have been installed, and after the internal components 300 have been secured to the new cabinet, the panel arrangement 600, the lips 640, 642, and the cover 650 can be reattached to the cabinet housing 401'.

FIGS. 21-27 illustrate another embodiment of a panel arrangement 700 configured to facilitate replacement of a cabinet housing 401" of another FDH 400" without recabling the internal components 300". In general, the internal components 300" mount within the cabinet housing 401" to a frame 330", which is detachably installed within the interior of the cabinet housing 401". For example, the internal components 300" can mount to one or more swing frames pivotally mounted to the frame 330". In the example shown in FIGS. 21-23, a first swing frame 350" and a second swing frame 352" are pivotally mounted to the frame 330". Disconnecting the frame 330" from the cabinet housing 401" also uncouples the swing frames 350", 352" from the cabinet housing 401".

Figure 23:
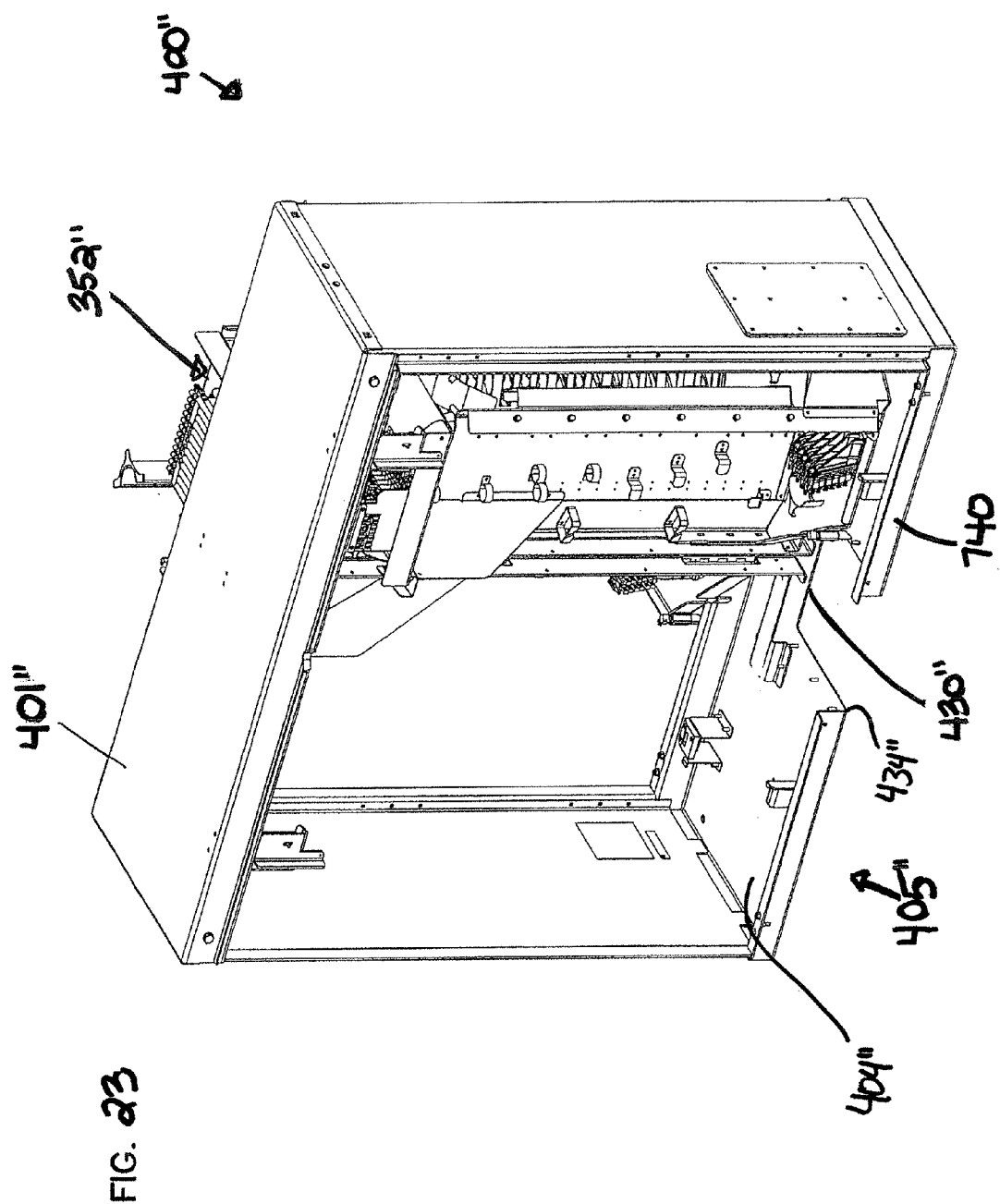
FIG. 23 is a rear, perspective view of the telecommunications cabinet of FIG. 22 in which an opening at a cable access region is visible.

FIGS. 22 and 23 illustrate front and rear views, respectively, of the cabinet housing 401" with the doors 410", 412", 414", 416" (FIG. 21) removed and with the second swing frame 352" pivoted out through the open front 403" of the cabinet housing 401". An access region 430" defined by the cabinet housing 401" can be seen in FIG. 23. The access region 430" has a closed end 432" opposite an open end 434", which is continuous with the open rear 405" of the cabinet housing 401".

Figure 24:
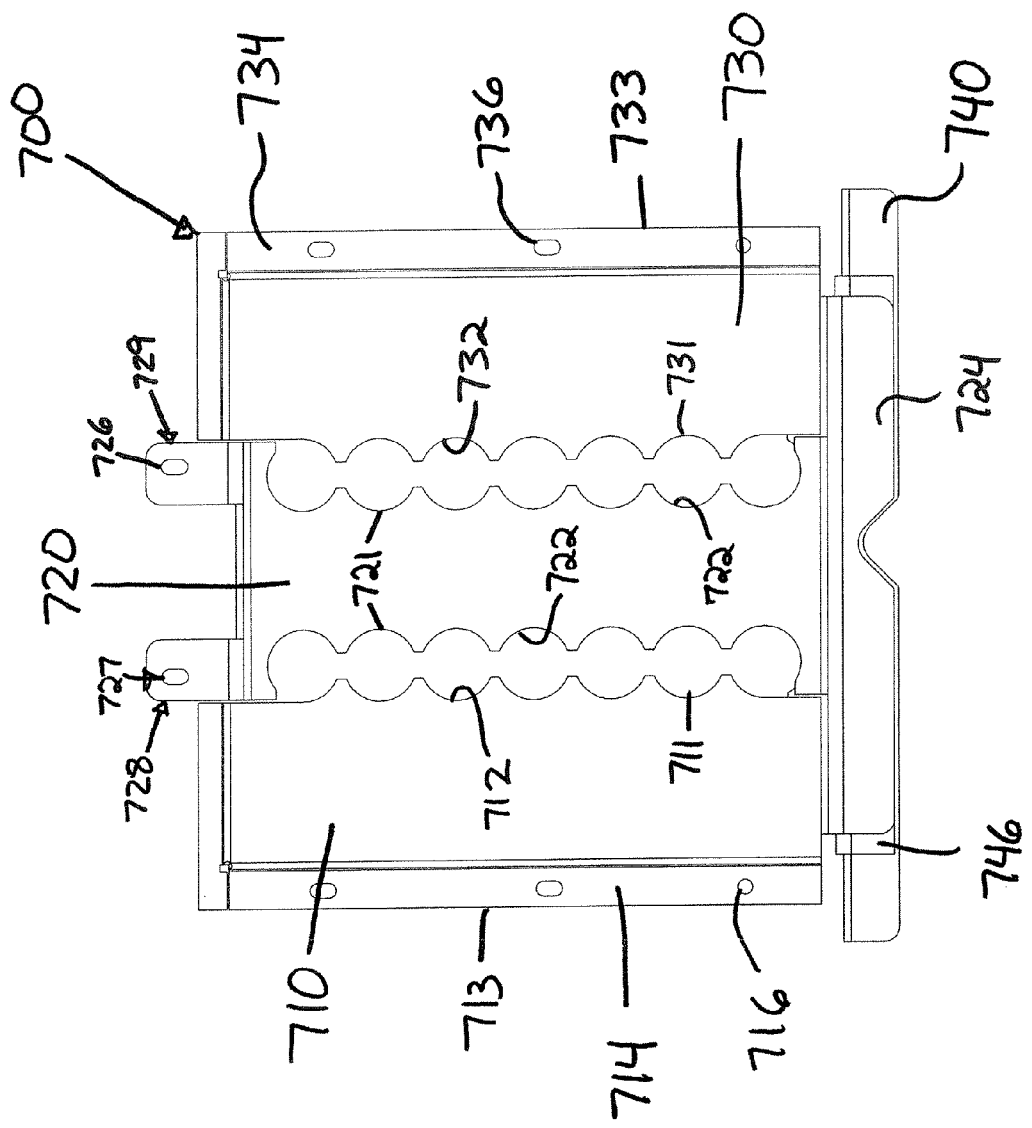
FIG. 24 is a top view of an example panel arrangement having features that are examples of inventive aspects in accordance with the principles of the present disclosure.

FIG. 24 illustrates the example panel arrangement 700 to be installed over the cable access region 430". The panel arrangement 700 includes an intermediate panel 720, a first end panel 710 arranged on one side of the intermediate panel 720, and a second end panel 730 arranged on an opposite side of the intermediate panel 720. The inside edges 711, 731 of the end panels 710, 730, respectively, form one or more concave slots 712, 732, respectively. The outer edges 721 of the intermediate panel 720 also form one or more concave slots 722.

When arranged, the concave slots 712 on the first end panel 710 cooperate with the concave slots 722 on the intermediate panel 720 to form a first set of openings through which the cables 320, 326 can extend. The concave slots 732 on the second end panel 730 also cooperate with the concave slots 722 on the intermediate panel 720 to form a second set of openings through which the cables 320, 326 can extend (see FIGS. 26 and 27).

Figure 25:
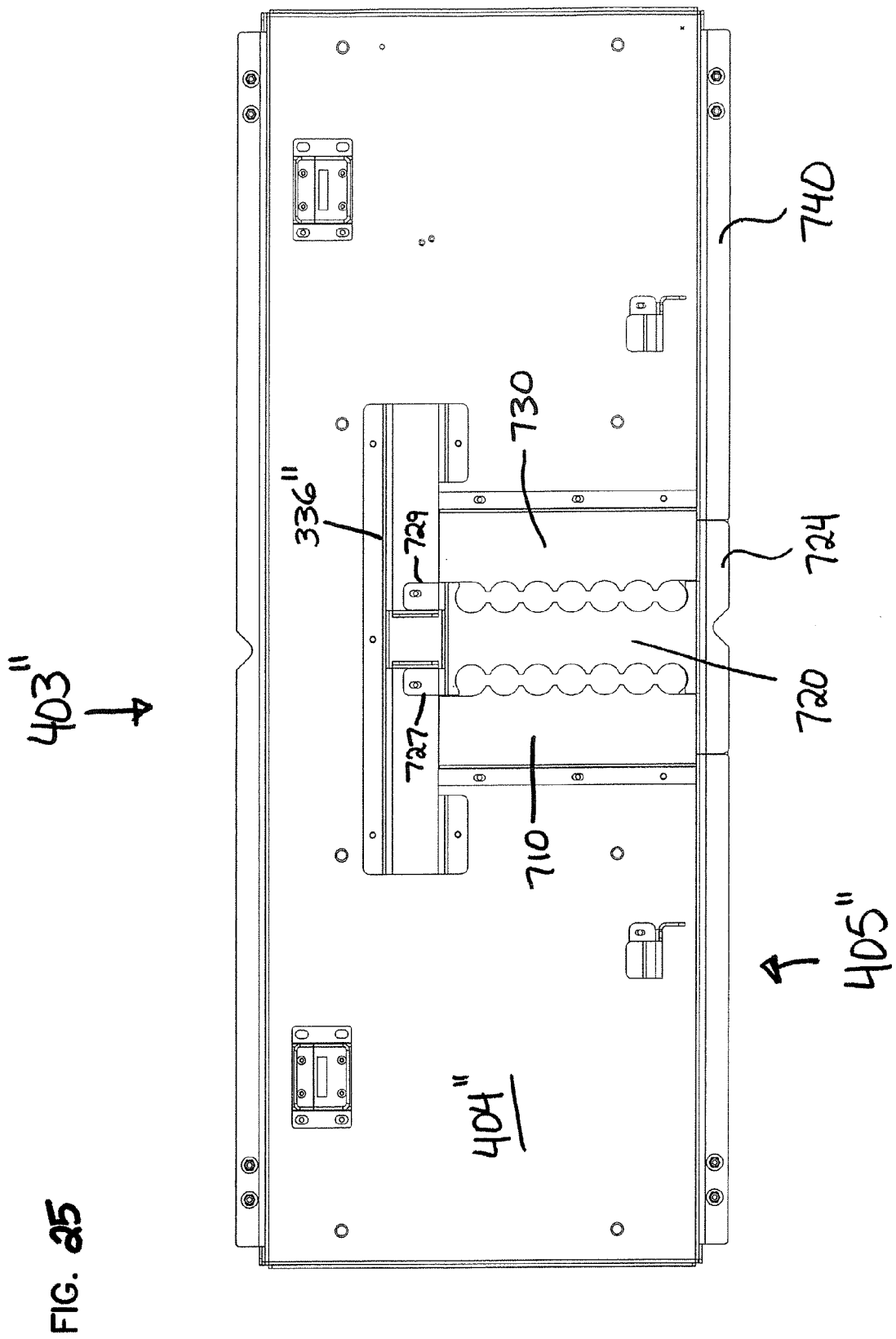
FIG. 25 is a top view showing the example panel arrangement of FIG. 24 arranged over a bottom panel of a telecommunications cabinet in accordance with an embodiment of the present disclosure.

The panels 710, 720, 730 can be installed over the cable access region 430" by inserting fasteners through apertures 716, 726, 736, respectively, defined in the panels 710, 720, 730 (see FIGS. 24 and 25). The first and second end panels 710, 730 have fastening sections 714, 734, respectively, extending along the outer edges 713, 733 opposite the intermediate panel 720. Each fastening section 714, 734 includes one or more apertures 716, 736, respectively, through which fasteners may be inserted.

The intermediate panel 720 has at least one fastening section 728 extending outwardly from the intermediate panel 720 towards the open front 403" of the cabinet housing 401". Typically, the fastening section 728 includes a first protruding tab 727 and a second protruding tab 729. Apertures 726 can be defined in the protruding tabs 727, 729. The intermediate panel 720 also includes a flange 724 extending towards the open rear 405" of the cabinet 401".

FIG. 25 illustrates a top view of the panel arrangement 700 installed over the access region 430" of the cabinet housing 401". The panel arrangement 700 also is coupled to a portion of the frame 330", e.g., a frame member 336". For example, the intermediate panel 720 of the panel arrangement 700 can be removably fastened (e.g., via tabs 727, 729) to the frame member 336".

In an embodiment, a lip 740 is removably coupled to a rearward edge of the bottom of the cabinet housing 401". The lip 740 can be interrupted (e.g., can define an opening or space) at a central portion of the lip 740. Typically, the opening defined by the lip 740 is continuous with the open end 434" defined by the cable access region 430". For example, a length of the interruption of the lip 740 can generally match a length of the open end 434" of the cable access region 430".

Figure 26:
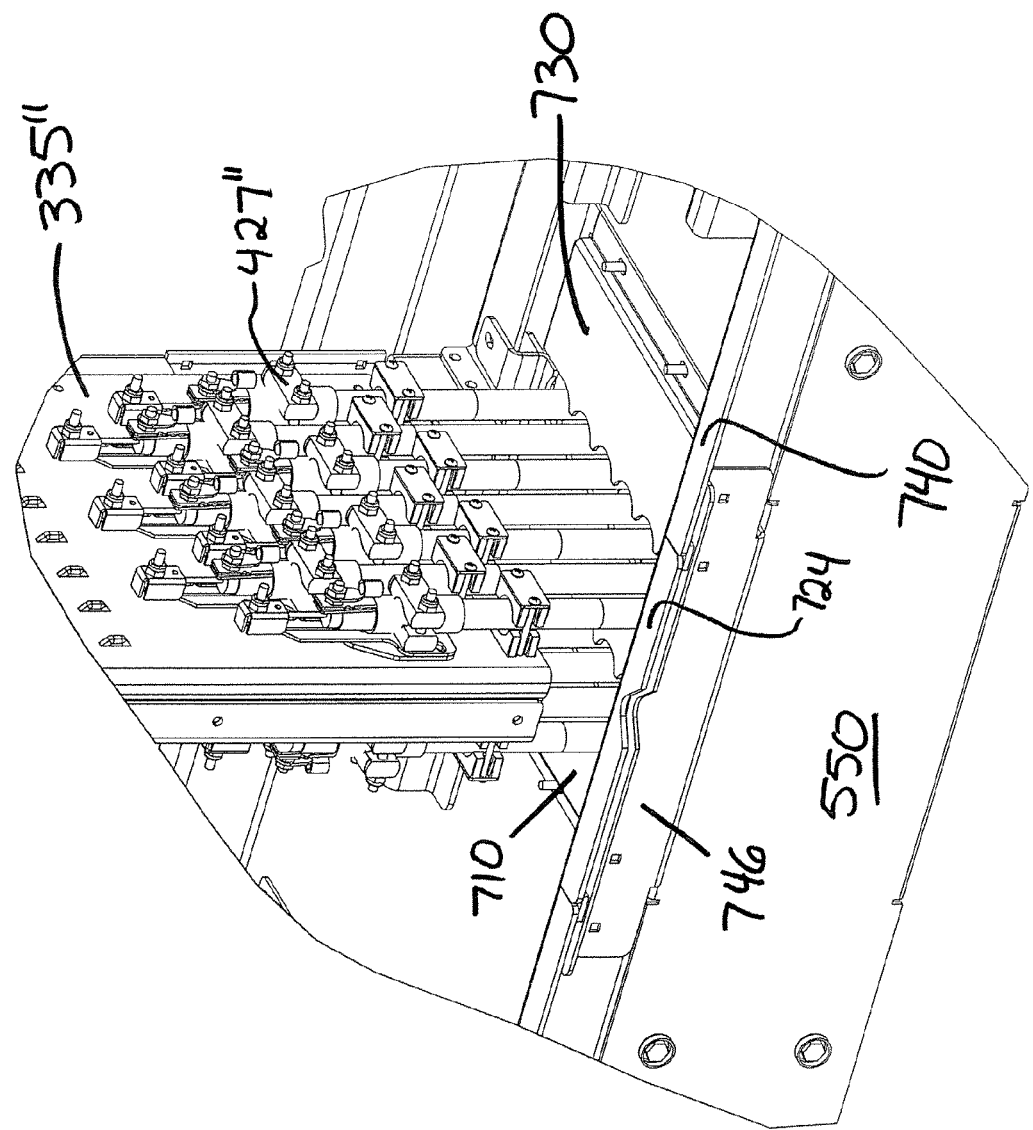
FIG. 26 is a partial view of the rear of the telecommunications cabinet of FIG. 21 showing cables entering and exiting the cabinet at a cable access region, which is covered by the panel arrangement of FIG. 24, in accordance with an embodiment of the present disclosure.

A lip access panel 746 can be removably coupled to the lip 740 to cover the interruption in the lip 740 (see FIG. 26). As shown in FIG. 26, an embodiment of the access panel 746 can extend over an outer and bottom portion of the lip 740. Removing the access panel 746 reveals the open end 434" of the cable access region 430" and the open, central portion of the lip 740.

To further expose the cable access region 430", at least one of the panels 710, 720, 730 of the panel arrangement 700 can be removed. For example, the intermediate panel 720 can be uncoupled from the cabinet housing 401" to facilitate sliding the cabinet housing 401" away from the cables extending through the cable access region 430". In a preferred embodiment, all three of the panels 710, 720, 730 are removed to facilitate removal of the cabinet housing 401". The panel arrangement 700 can be reinstalled over the access region of a new cabinet housing when the new cabinet housing is installed.

Figure 28:
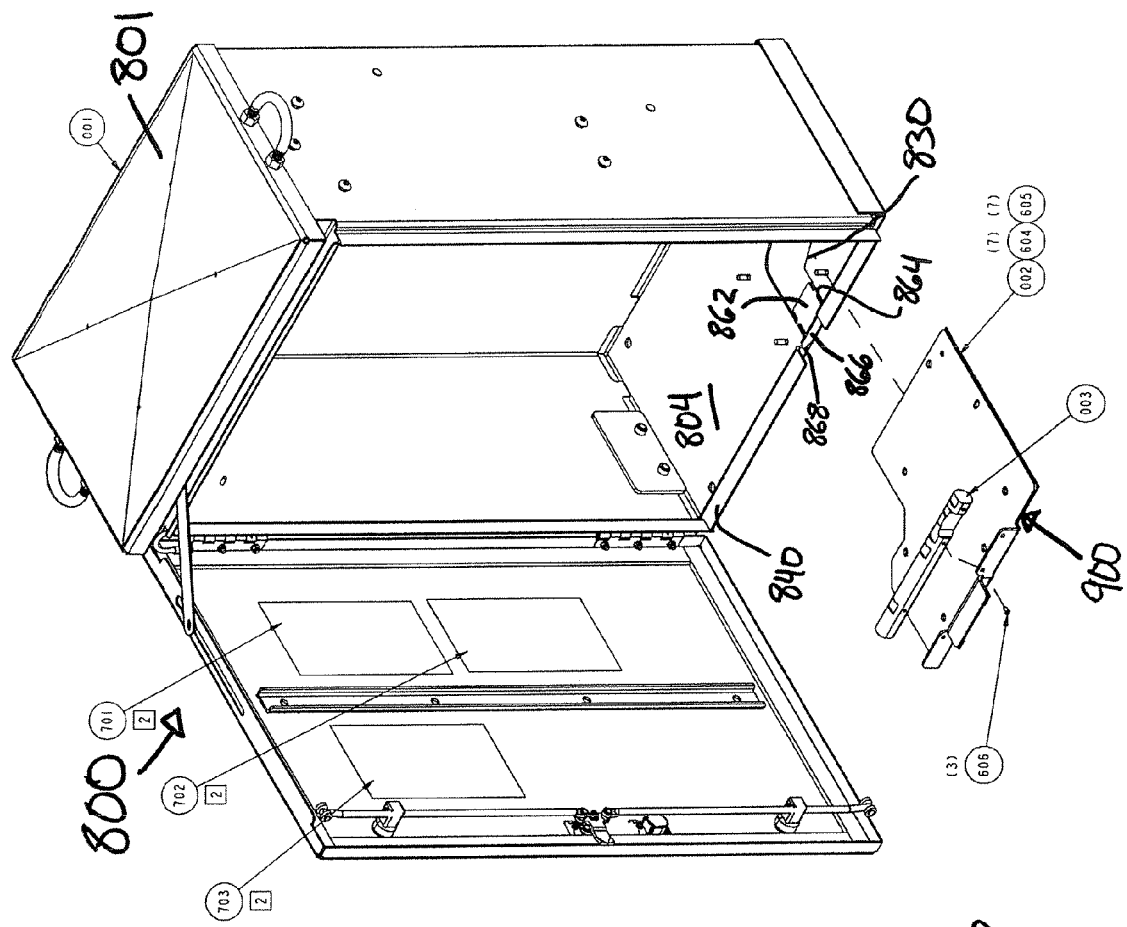
FIG. 28 illustrates another example of a panel arrangement and an example of a breakout arrangement coupled to another example of a telecommunications cabinet in accordance with an embodiment of the present disclosure.

FIG. 28 illustrates another example of an FDH 800 having a cabinet housing 801 defining a cable access region 830. Panel arrangements, such as any of the panel arrangements described above, can be positioned over the access region 830 within the FDH 800. A panel arrangement 900 is schematically shown exploded from the cabinet housing 801. One or more apertures (not shown) through which cables 320, 326 can extend can be defined by the panel arrangement 900. For example, the panel arrangement 900 can include multiple panels cooperating to define a row of apertures as described above with panel arrangements 600 and 700.

A breakout arrangement 860 can facilitate removal and replacement of the cabinet housing 801 while maintaining the stability and integrity of the cabinet housing 801. For example, as shown in FIG. 28, the access region 830 of the cabinet housing 801 does not have an open end. Rather, the access region 830 is defined by a closed end (located behind the side wall 806) and a break-out arrangement 860 arranged opposite the closed end.

The breakout arrangement 860 generally includes one or more members 862, 866 removably coupled to the cabinet housing 801 via perforations or break points 864, 868. When force is applied to the break points 864, 868 (e.g., by a tool or by hand), the members 862, 866 are removed from the cabinet housing 801 to provide an open end of the cable access region 830. Typically, the open end abuts the open front 803 or open rear 805 of the cabinet housing 801.

In the example shown, the breakout arrangement 860 includes a first member 862 extending across the bottom panel 804 and a second member 866 extending across an interrupted lip 840. Removing these breakout members 862, 866 provides a continuous path between the access region 830 and the open front 803 of the cabinet housing 801 along which cables 320, 326 can pass during replacement of the cabinet housing 801.

It will be appreciated that the telecommunications cabinets can be manufactured in a variety of different sizes. However, to promote manufacturing efficiency, it is preferred for the splitters to be manufactured with pigtails having uniform lengths. To accommodate the different sizes of fiber distribution hubs, the pigtails are preferably designed long enough to work in the largest fiber distribution hub expected to be used. For the smaller distribution hubs, excess length provided in the pigtails can be taken up by routing the excess length through various cable management structures.

The above specification, examples and data provide a complete description of the manufacture and use of the invention. It will be appreciated that the various aspects of the present disclosure provide numerous advantages. Also, many embodiments of the invention can be made without departing from the spirit and scope of the invention. For example, a cabinet housing can be configured to be removed by sliding the housing rearwardly of an access compartment and allowing the internal components to pass through an open front of the cabinet. In addition, the breakout arrangement described above is not limited to the cabinet described and can be used with any telecommunications cabinet.

The invention resides in the claims hereinafter appended.

We claim:

1. Method for replacing a cabinet defining a cable access region through which fiber optic cables extend into and out of the cabinet, the method comprising:

obtaining access to an interior of the cabinet through an open side of the cabinet, the open side facing in a first direction, the cabinet housing a frame and internal fiber optic components which are mounted to the frame;

removing a panel arrangement from the cable access region of the cabinet to reveal an open end of the cable access region, the open end of the cable access region being continuous with the open side of the cabinet;

uncoupling the frame from the cabinet; and sliding the cabinet in a second direction away from the frame and the internal components, the second direction being opposite from the first direction, wherein the fiber optic cables pass through the open end of the cable access region and through the open side of the cabinet.

2. The method of claim 1, wherein obtaining access to the interior of the cabinet comprises opening a door of the cabinet.

3. The method of claim 1, further comprising:

stabilizing the frame before sliding the cabinet in the second direction.

4. The method of claim 1, further comprising:

removing a panel from a lip extending partially over the open side of the cabinet to reveal an aperture extending through the lip, the aperture joining with the open end of the cable access region and the open side of the cabinet.

5. The method of claim 1, further comprising:

removing a lip extending along the open side of the cabinet, the lip configured to retain fiber optic cables within the interior of the cabinet when installed on the cabinet.

6. The method of claim 1, further comprising:

applying pressure to a break point of a breakout arrangement located at the cable access region of the cabinet; and removing the breakout arrangement from the cabinet.

7. The method of claim 1, further comprising:

removing a cover from an access compartment on which the cabinet is mounted, wherein removing the cover joins an interior of the access compartment with the open end of the cable access region and the open side of the cabinet.

8. The method of claim 1, wherein removing the panel arrangement comprises removing a first panel of the panel arrangement to expose the open end of the cable access region.

9. The method of claim 8, wherein removing the first panel comprises removing a lip to which the first panel is coupled.

10. The method of claim 1, further comprising:

installing a second cabinet around the frame and the internal components, the second cabinet defining a second cable access region having an open end continuous with an open side of the second cabinet, wherein installing the second cabinet around the frame includes sliding the open end of the second cable access region past the fiber optic cables and fastening the frame to the second cabinet.

* * * * *